(12) United States Patent
Kim et al.

(10) Patent No.: US 7,725,079 B2
(45) Date of Patent: May 25, 2010

(54) METHOD AND SYSTEM FOR AUTOMATIC CONTROL IN AN INTERFERENCE CANCELLATION DEVICE

(75) Inventors: Andrew Joo Kim, Atlanta, GA (US); Edward Gebara, Atlanta, GA (US); Bruce C. Schmukler, Duluth, GA (US); Mark W. Dickmann, Palm Harbor, FL (US); Michael F. Farrell, Atlanta, GA (US); Michael G. Vrazel, Chamblee, GA (US); David Anthony Stelliga, Palo Alto, CA (US); Joy Laskar, Marietta, GA (US); Charles E. Summers, Woodstock, GA (US)

(73) Assignee: Quellan, Inc., Atlanta, GA (US)

( * ) Notice: Subject to any disclaimer, the term of this patent is extended or adjusted under 35 U.S.C. 154(b) by 981 days.

(21) Appl. No.: 11/450,543

(22) Filed: Jun. 9, 2006

(65) Prior Publication Data

US 2007/0060059 A1 Mar. 15, 2007

Related U.S. Application Data

(63) Continuation-in-part of application No. 11/302,896, filed on Dec. 14, 2005, now Pat. No. 7,522,883.

(60) Provisional application No. 60/635,817, filed on Dec. 14, 2004, provisional application No. 60/689,467, filed on Jun. 10, 2005, provisional application No. 60/696,905, filed on Jul. 6, 2005, provisional application No. 60/719,055, filed on Sep. 21, 2005, provisional application No. 60/720,324, filed on Sep. 23, 2005.

(51) Int. Cl.
*H04B 1/00* (2006.01)
*H04B 15/00* (2006.01)

(52) U.S. Cl. .................. 455/63.1; 455/570; 455/114.2; 455/222; 455/226.3

(58) Field of Classification Search ............... 455/63.1, 455/570, 114.2, 222, 226.3, 278.1, 296
See application file for complete search history.

(56) References Cited

U.S. PATENT DOCUMENTS 2,632,058 A 3/1953 Gray ........................... 178/15

(Continued)

FOREIGN PATENT DOCUMENTS

EP 0 527 966 B1 9/1994

(Continued)

OTHER PUBLICATIONS

André et al.; *InP DHBT Technology and Design Methodology for High-Bit-Rate Optical Communications Circuits*; IEEE Journal of Solid-State Circuits; vol. 33, No. 9, Sep. 1998; pp. 1328-1335.

(Continued)

*Primary Examiner*—Tuan A Pham
(74) *Attorney, Agent, or Firm*—King & Spalding

(57) ABSTRACT

Signals propagating on an aggressor communication channel can cause detrimental interference in a victim communication channel. A signal processing circuit can generate an interference cancellation signal that, when applied to the victim communication channel, cancels the detrimental interference. The signal processing circuit can dynamically adjust or update two or more aspects of the interference cancellation signal, such as an amplitude or gain parameter and a phase or delay parameter. Via the dynamic adjustments, the signal processing circuit can adapt to changing conditions, thereby maintaining an acceptable level of interference cancellation in a fluctuating operating environment. A control circuit that implements the parametric adjustments can have at least two modes of operation, one for adjusting the amplitude parameter and one for adjusting the phase parameter. The modes can be selectable or can be intermittently available, for example.

11 Claims, 20 Drawing Sheets

U.S. PATENT DOCUMENTS

| | | | |
|---|---|---|---|
| 3,445,771 A | 5/1969 | Clapham et al. ............... 325/42 |
| 3,571,725 A | 3/1971 | Kaneko et al. ................ 328/14 |
| 3,599,122 A | 8/1971 | Leuthoki ..................... 333/29 |
| 3,633,108 A | 1/1972 | Kneuer ....................... 325/323 |
| 3,714,437 A | 1/1973 | Kinsel ........................ 359/185 |
| 3,806,915 A | 4/1974 | Higgins et al. ............... 340/347 |
| 3,977,795 A | 8/1976 | Buschmann ................ 356/256 |
| 4,201,909 A | 5/1980 | Dogliotti et al. ............ 455/608 |
| 4,287,756 A | 9/1981 | Gallagher ................ 73/61.1 R |
| 4,288,872 A | 9/1981 | Tamburelli ................... 375/14 |
| 4,349,914 A | 9/1982 | Evans .......................... 375/40 |
| 4,363,127 A | 12/1982 | Evans et al. .................. 375/30 |
| 4,386,339 A | 5/1983 | Henry et al. ................ 340/347 |
| 4,387,461 A | 6/1983 | Evans ........................... 371/5 |
| 4,393,499 A | 7/1983 | Evans ........................... 371/5 |
| 4,410,878 A | 10/1983 | Stach ................ 340/347 DD |
| 4,464,771 A | 8/1984 | Sorensen .................... 375/120 |
| 4,470,126 A | 9/1984 | Haque ....................... 364/825 |
| 4,475,227 A | 10/1984 | Belfield ....................... 381/30 |
| 4,479,266 A | 10/1984 | Eumurian et al. ........... 455/608 |
| 4,521,883 A | 6/1985 | Roché ....................... 370/100 |
| 4,580,263 A | 4/1986 | Watanabe et al. .............. 371/5 |
| 4,584,720 A | 4/1986 | Garrett ....................... 455/608 |
| 4,618,941 A | 10/1986 | Linder et al. ................ 364/724 |
| 4,646,173 A | 2/1987 | Kammeyer et al. ............ 360/51 |
| 4,651,026 A | 3/1987 | Serfaty et al. ............... 307/269 |
| 4,688,245 A * | 8/1987 | Schenk .................. 379/406.08 |
| 4,751,497 A | 6/1988 | Torii ............................ 340/347 |
| 4,830,493 A | 5/1989 | Giebeler ..................... 356/328 |
| 4,847,521 A | 7/1989 | Huignard et al. .............. 307/425 |
| 4,864,590 A | 9/1989 | Arnon et al. ................... 375/14 |
| 4,873,700 A | 10/1989 | Wong ............................ 375/76 |
| 4,912,726 A | 3/1990 | Iwamatsu et al. ............ 375/20 |
| 4,942,593 A | 7/1990 | Whiteside et al. ........... 375/118 |
| 4,953,041 A | 8/1990 | Huber ........................ 360/46 |
| 4,959,535 A | 9/1990 | Garrett .................... 250/214 R |
| 4,978,957 A | 12/1990 | Hotta et al. ................. 341/156 |
| 5,007,106 A | 4/1991 | Kahn et al. ................. 455/619 |
| 5,008,957 A | 4/1991 | Klyono ...................... 455/618 |
| 5,012,475 A | 4/1991 | Campbell ..................... 372/29 |
| 5,067,126 A | 11/1991 | Moore ......................... 370/112 |
| 5,072,221 A | 12/1991 | Schmidt ....................... 341/159 |
| 5,111,065 A | 5/1992 | Roberge ..................... 307/270 |
| 5,113,278 A | 5/1992 | Degura et al. ................ 359/154 |
| 5,115,450 A | 5/1992 | Arcuri ............................ 375/7 |
| 5,121,411 A | 6/1992 | Fluharty ....................... 375/20 |
| 5,128,790 A | 7/1992 | Heidemann et al. ......... 359/132 |
| 5,132,639 A | 7/1992 | Blauvelt et al. .............. 330/149 |
| 5,151,698 A | 9/1992 | Pophillat ...................... 341/52 |
| 5,181,034 A | 1/1993 | Takakura et al. ............ 341/144 |
| 5,181,136 A | 1/1993 | Kavehrad et al. ........... 359/190 |
| 5,184,131 A | 2/1993 | Ikeda .......................... 341/165 |
| 5,208,833 A | 5/1993 | Erhart et al. ................. 375/20 |
| 5,222,103 A | 6/1993 | Gross .......................... 375/54 |
| 5,223,834 A | 6/1993 | Wang et al. ................. 341/136 |
| 5,225,798 A | 7/1993 | Hunsinger et al. ........... 333/165 |
| 5,237,590 A | 8/1993 | Kazawa et al. ................ 375/20 |
| 5,243,613 A | 9/1993 | Gysel et al. ................... 372/26 |
| 5,252,930 A | 10/1993 | Blauvelt ..................... 330/149 |
| 5,282,072 A | 1/1994 | Nazarathy et al. ............ 359/157 |
| 5,283,679 A | 2/1994 | Wedding .................... 359/154 |
| 5,291,031 A | 3/1994 | MacDonald et al. ......... 250/577 |
| 5,293,406 A | 3/1994 | Suzuki ......................... 375/59 |
| 5,300,930 A | 4/1994 | Burger et al. ................ 341/96 |
| 5,321,543 A | 6/1994 | Huber ......................... 359/187 |
| 5,321,710 A | 6/1994 | Cornish et al. ................ 372/26 |
| 5,327,279 A | 7/1994 | Farina et al. ................ 359/180 |
| 5,343,322 A | 8/1994 | Pirio et al. ................... 359/173 |
| 5,351,148 A | 9/1994 | Maeda et al. ................ 359/124 |
| 5,355,240 A | 10/1994 | Prigent et al. ................ 359/161 |
| 5,361,156 A | 11/1994 | Pidgeon ...................... 359/161 |
| 5,371,625 A | 12/1994 | Wedding et al. ............. 319/173 |
| 5,373,384 A | 12/1994 | Hebert ........................ 359/161 |
| 5,376,786 A | 12/1994 | MacDonald ............ 250/227.12 |
| 5,382,955 A | 1/1995 | Knierim ........................ 341/64 |
| 5,387,887 A | 2/1995 | Zimmerman et al. ........ 333/166 |
| 5,408,485 A | 4/1995 | Ries ............................. 372/38 |
| 5,413,047 A | 5/1995 | Evans et al. .................. 102/302 |
| 5,416,628 A | 5/1995 | Betti et al. ................... 359/181 |
| 5,418,637 A | 5/1995 | Kuo ............................ 359/161 |
| 5,424,680 A | 6/1995 | Nazarathy et al. ........... 330/149 |
| 5,428,643 A | 6/1995 | Razzell ....................... 375/308 |
| 5,428,831 A | 6/1995 | Monzello et al. ............ 455/296 |
| 5,436,752 A | 7/1995 | Wedding .................... 359/195 |
| 5,436,756 A | 7/1995 | Knox et al. .................. 359/260 |
| 5,444,864 A | 8/1995 | Smith ........................... 455/84 |
| 5,450,044 A | 9/1995 | Hulick ........................ 332/103 |
| 5,481,389 A | 1/1996 | Pidgeon et al. .............. 359/161 |
| 5,481,568 A | 1/1996 | Yada ........................... 375/340 |
| 5,483,552 A | 1/1996 | Shimazaki et al. ........... 375/233 |
| 5,504,633 A | 4/1996 | Van Den Enden ............. 360/65 |
| 5,510,919 A | 4/1996 | Wedding .................... 359/115 |
| 5,515,196 A | 5/1996 | Kitajima et al. .............. 359/180 |
| 5,528,710 A | 6/1996 | Burton et al. ................. 385/16 |
| 5,541,955 A | 7/1996 | Jacobsmeyer ............... 375/222 |
| 5,548,253 A | 8/1996 | Durrant ....................... 332/103 |
| 5,557,439 A | 9/1996 | Alexander et al. ........... 359/130 |
| 5,574,743 A | 11/1996 | van der Poel et al. ......... 372/46 |
| 5,574,978 A * | 11/1996 | Talwar et al. ............... 455/63.1 |
| 5,589,786 A | 12/1996 | Bella et al. ................... 327/108 |
| 5,604,724 A | 2/1997 | Shiokawa |
| 5,606,734 A | 2/1997 | Bahu .......................... 455/303 |
| 5,612,653 A | 3/1997 | Dodds et al. ................. 333/124 |
| 5,617,135 A | 4/1997 | Noda et al. .................... 348/12 |
| 5,621,764 A | 4/1997 | Ushirokawa et al. ......... 375/317 |
| 5,625,360 A | 4/1997 | Garrity et al. ................ 341/144 |
| 5,625,722 A | 4/1997 | Froberg et al. ................. 385/1 |
| 5,644,325 A | 7/1997 | King et al. ................... 345/20 |
| 5,648,987 A | 7/1997 | Yang et al. .................. 375/232 |
| 5,670,871 A | 9/1997 | Man et al. ..................... 324/96 |
| 5,675,600 A | 10/1997 | Yamamoto .................... 372/38 |
| 5,678,198 A | 10/1997 | Lemson ...................... 455/67.1 |
| 5,689,356 A | 11/1997 | Rainal ......................... 359/181 |
| 5,691,978 A | 11/1997 | Kenworthy .................. 370/278 |
| 5,692,011 A | 11/1997 | Nobakht et al. .............. 375/233 |
| 5,699,022 A | 12/1997 | Tovar ........................... 333/18 |
| 5,706,008 A | 1/1998 | Huntley, Jr. et al. ......... 341/156 |
| 5,721,315 A | 2/1998 | Evans et al. .................. 525/74 |
| 5,723,176 A | 3/1998 | Keyworth et al. ......... 427/163.2 |
| 5,751,726 A | 5/1998 | Kim ............................ 371/6 |
| 5,754,681 A | 5/1998 | Watanabe et al. ............ 382/159 |
| 5,757,763 A | 5/1998 | Green et al. .............. 369/275.3 |
| 5,761,243 A | 6/1998 | Russell et al. ............... 375/233 |
| 5,764,542 A | 6/1998 | Gaudette et al. ............ 364/574 |
| 5,774,505 A | 6/1998 | Baugh ......................... 375/348 |
| 5,783,630 A | 7/1998 | Evans et al. .................. 525/74 |
| 5,784,032 A | 7/1998 | Johnston et al. ............. 343/702 |
| 5,790,595 A | 8/1998 | Benthin et al. .............. 375/224 |
| 5,798,854 A | 8/1998 | Blauvelt et al. .............. 359/161 |
| 5,801,657 A | 9/1998 | Fowler et al. ................ 341/155 |
| 5,802,089 A | 9/1998 | Link ............................ 372/38 |
| 5,812,578 A | 9/1998 | Schemmann et al. .......... 372/46 |
| 5,825,211 A | 10/1998 | Smith et al. .................... 327/19 |
| 5,825,257 A | 10/1998 | Klymyshyn et al. ......... 332/100 |
| 5,825,825 A | 10/1998 | Altmann et al. .............. 375/293 |
| 5,828,329 A | 10/1998 | Burns .......................... 341/155 |
| 5,835,848 A | 11/1998 | Bi et al. ......................... 455/24 |
| 5,839,105 A | 11/1998 | Ostendorf et al. ........... 704/256 |
| 5,841,841 A | 11/1998 | Dodds et al. ............. 379/93.08 |
| 5,844,436 A | 12/1998 | Altmann ..................... 327/156 |
| 5,848,139 A | 12/1998 | Grover ........................ 379/114 |
| 5,850,409 A | 12/1998 | Link ............................. 372/38 |
| 5,850,505 A | 12/1998 | Grover et al. ............ 395/182.02 |
| 5,852,389 A | 12/1998 | Kumar et al. ................ 332/103 |

| Patent | Date | Inventor | Class |
|---|---|---|---|
| 5,859,862 A | 1/1999 | Hikasa et al. | 372/38 |
| 5,861,966 A | 1/1999 | Ortel | 351/125 |
| 5,872,468 A | 2/1999 | Dyke | 327/72 |
| 5,878,390 A | 3/1999 | Kawai et al. | 704/231 |
| 5,880,870 A | 3/1999 | Sieben et al. | 359/181 |
| 5,883,910 A | 3/1999 | Link | 372/38 |
| 5,887,022 A | 3/1999 | Lee et al. | 375/202 |
| 5,889,759 A | 3/1999 | McGibney | 370/207 |
| 5,896,392 A | 4/1999 | Ono et al. | 371/5.2 |
| 5,912,749 A | 6/1999 | Harstead et al. | 359/123 |
| 5,920,600 A | 7/1999 | Yamaoka et al. | 375/376 |
| 5,923,226 A | 7/1999 | Kakura et al. | 333/18 |
| 5,942,576 A | 8/1999 | Evans et al. | 525/73 |
| 5,943,380 A | 8/1999 | Marchesani et al. | 375/376 |
| 5,943,457 A | 8/1999 | Hayward et al. | 385/24 |
| 5,949,926 A | 9/1999 | Davies | 385/3 |
| 5,959,032 A | 9/1999 | Evans et al. | 525/74 |
| 5,959,750 A | 9/1999 | Eskildsen et al. | 359/134 |
| 5,965,667 A | 10/1999 | Evans et al. | 525/74 |
| 5,968,198 A | 10/1999 | Hassan et al. | 714/752 |
| 5,978,417 A | 11/1999 | Baker et al. | 375/232 |
| 5,983,178 A | 11/1999 | Naito et al. | 704/245 |
| 5,985,999 A | 11/1999 | Dominguez et al. | 525/74 |
| 5,995,565 A | 11/1999 | Tong et al. | 375/346 |
| 5,999,300 A | 12/1999 | Davies et al. | 359/183 |
| 6,002,274 A | 12/1999 | Smith et al. | 327/19 |
| 6,002,717 A | 12/1999 | Gaudet | 375/232 |
| 6,009,424 A | 12/1999 | Lepage et al. | 707/6 |
| 6,011,952 A | 1/2000 | Dankberg et al. | 455/24 |
| 6,021,110 A | 2/2000 | McGibney | 370/208 |
| 6,028,658 A | 2/2000 | Hamada et al. | 352/129 |
| 6,031,048 A | 2/2000 | Evans et al. | 525/73 |
| 6,031,866 A | 2/2000 | Oler et al. | 375/219 |
| 6,031,874 A | 2/2000 | Chennakeshu et al. | 375/262 |
| 6,034,996 A | 3/2000 | Herzberg | 375/265 |
| 6,035,080 A | 3/2000 | Henry et al. | 385/24 |
| 6,041,299 A | 3/2000 | Schuster et al. | 704/230 |
| 6,052,420 A | 4/2000 | Yeap et al. | 375/346 |
| 6,072,364 A | 6/2000 | Jeckeln et al. | 330/149 |
| 6,072,615 A | 6/2000 | Mamyshev | 359/183 |
| 6,078,627 A | 6/2000 | Crayford | 375/286 |
| 6,084,931 A | 7/2000 | Powell, II et al. | 375/355 |
| 6,091,782 A | 7/2000 | Harano | 375/287 |
| 6,093,496 A | 7/2000 | Dominguez et al. | 428/500 |
| 6,093,773 A | 7/2000 | Evans et al. | 525/73 |
| 6,108,474 A | 8/2000 | Eggleton et al. | 385/122 |
| 6,111,477 A | 8/2000 | Klymyshyn et al. | 333/139 |
| 6,118,563 A | 9/2000 | Boskovic et al. | 359/124 |
| 6,118,567 A | 9/2000 | Alameh et al. | 359/189 |
| 6,127,480 A | 10/2000 | Dominguez et al. | 525/74 |
| 6,140,416 A | 10/2000 | Evans et al. | 525/74 |
| 6,140,858 A | 10/2000 | Dumont | 327/317 |
| 6,140,972 A | 10/2000 | Johnston et al. | 343/725 |
| 6,141,127 A | 10/2000 | Boivin et al. | 359/124 |
| 6,141,387 A | 10/2000 | Zhang | 375/261 |
| 6,148,428 A | 11/2000 | Welch et al. | 714/752 |
| 6,151,150 A | 11/2000 | Kikuchi | 359/194 |
| 6,154,301 A | 11/2000 | Harvey | 359/193 |
| 6,163,638 A | 12/2000 | Eggleton et al. | 385/37 |
| 6,169,764 B1 | 1/2001 | Babanezhad | 375/233 |
| 6,169,912 B1 | 1/2001 | Zuckerman | 455/570 |
| 6,181,454 B1 | 1/2001 | Nagahori et al. | 359/189 |
| 6,191,719 B1 | 2/2001 | Bult et al. | 341/144 |
| 6,201,916 B1 | 3/2001 | Eggleton et al. | 385/122 |
| 6,208,792 B1 | 3/2001 | Hwang et al. | 385/129 |
| 6,211,978 B1 | 4/2001 | Wojtunik | 359/114 |
| 6,212,654 B1 | 4/2001 | Lou et al. | 714/701 |
| 6,214,914 B1 | 4/2001 | Evans et al. | 524/323 |
| 6,215,812 B1 | 4/2001 | Young et al. | 375/144 |
| 6,219,633 B1 | 4/2001 | Lepage | 704/9 |
| 6,222,861 B1 | 4/2001 | Kuo et al. | 372/20 |
| 6,226,112 B1 | 5/2001 | Denk et al. | 359/138 |
| 6,236,963 B1 | 5/2001 | Naito et al. | 704/241 |
| 6,259,836 B1 | 7/2001 | Dodds | 385/24 |
| 6,259,847 B1 | 7/2001 | Lenz et al. | 385/131 |
| 6,268,816 B1 | 7/2001 | Bult et al. | 341/144 |
| 6,271,690 B1 | 8/2001 | Hirano et al. | 327/75 |
| 6,271,944 B1 | 8/2001 | Schemmann et al. | 359/124 |
| 6,281,824 B1 | 8/2001 | Masuda | 341/144 |
| 6,285,709 B1 | 9/2001 | Alelyunas et al. | |
| 6,288,668 B1 | 9/2001 | Tsukamoto et al. | 341/172 |
| 6,289,055 B1 | 9/2001 | Knotz | 375/286 |
| 6,289,151 B1 | 9/2001 | Kazarinov et al. | 385/32 |
| 6,295,325 B1 | 9/2001 | Farrow et al. | 375/327 |
| 6,297,678 B1 | 10/2001 | Gholami | 327/198 |
| 6,298,459 B1 | 10/2001 | Tsukamoto | 714/746 |
| 6,304,199 B1 | 10/2001 | Fang et al. | 341/118 |
| 6,311,045 B1 | 10/2001 | Domokos | 455/78 |
| 6,313,713 B1 | 11/2001 | Ho et al. | 333/1.1 |
| 6,314,147 B1 | 11/2001 | Liang et al. | 375/346 |
| 6,317,247 B1 | 11/2001 | Yang et al. | 359/245 |
| 6,317,469 B1 | 11/2001 | Herbert | 375/293 |
| 6,341,023 B1 | 1/2002 | Puc | 359/124 |
| 6,356,374 B1 | 3/2002 | Farhan | 359/180 |
| 6,388,786 B1 | 5/2002 | Ono et al. | 359/181 |
| 6,411,117 B1 | 6/2002 | Hatamian | 324/765 |
| 6,421,155 B1 | 7/2002 | Yano | 359/181 |
| 6,445,476 B1 | 9/2002 | Kahn et al. | 359/184 |
| 6,473,131 B1 | 10/2002 | Neugebauer et al. | 348/572 |
| 6,501,792 B2 | 12/2002 | Webster | 375/232 |
| 6,539,204 B1 | 3/2003 | Marsh et al. | 455/63 |
| 6,560,257 B1 | 5/2003 | DeSalvo et al. | 372/38.02 |
| 6,650,189 B1 | 11/2003 | Romao | |
| 6,665,348 B1 | 12/2003 | Feher | 375/259 |
| 6,665,500 B2 | 12/2003 | Snawerdt | 398/185 |
| 6,718,138 B1 | 4/2004 | Sugawara | 398/9 |
| 6,751,587 B2 | 6/2004 | Thyssen et al. | 704/228 |
| 6,816,101 B2 | 11/2004 | Hietala et al. | 341/155 |
| 6,819,166 B1 | 11/2004 | Choi et al. | 327/551 |
| 6,819,943 B2 | 11/2004 | Dalal | |
| 6,920,315 B1 | 7/2005 | Wilcox et al. | |
| 6,961,019 B1 | 11/2005 | McConnell et al. | 342/357.1 |
| 7,035,361 B2 | 4/2006 | Kim et al. | 375/350 |
| 7,050,388 B2 | 5/2006 | Kim et al. | 370/201 |
| 7,123,676 B2 | 10/2006 | Gebara et al. | |
| 7,149,256 B2 | 12/2006 | Vrazel et al. | |
| 7,173,551 B2 | 2/2007 | Vrazel et al. | |
| 7,212,580 B2 | 5/2007 | Hietala et | |
| 7,215,721 B2 | 5/2007 | Hietala et al. | |
| 7,307,569 B2 | 12/2007 | Vrazel et al. | |
| 2001/0024542 A1 | 9/2001 | Aina et al. | 385/24 |
| 2002/0086640 A1 | 7/2002 | Belcher et al. | 455/63.1 |
| 2002/0196508 A1 | 12/2002 | Wei et al. | 359/183 |
| 2003/0002121 A1 | 1/2003 | Miyamoto et al. | 359/183 |
| 2003/0007631 A1 | 1/2003 | Bolognesi et al. | |
| 2003/0008628 A1 | 1/2003 | Lindell et al. | 455/180.1 |
| 2003/0030876 A1 | 2/2003 | Takei | 359/187 |
| 2003/0053534 A1 | 3/2003 | Sivadas et al. | 375/229 |
| 2003/0058976 A1 | 3/2003 | Ohta et al. | 375/350 |
| 2003/0063354 A1 | 4/2003 | Davidson | 359/189 |
| 2003/0067990 A1 | 4/2003 | Bryant | 375/259 |
| 2004/0053578 A1 | 3/2004 | Grabon et al. | |
| 2004/0105462 A1 | 6/2004 | Kim et al. | |
| 2004/0114888 A1 | 6/2004 | Rich et al. | |
| 2004/0197103 A1 | 10/2004 | Roberts et al. | 398/159 |
| 2004/0213354 A1 | 10/2004 | Jones et al. | 375/285 |
| 2004/0218756 A1 | 11/2004 | Tang et al. | 379/417 |
| 2004/0240678 A1* | 12/2004 | Nakamura et al. | 381/71.11 |
| 2005/0069063 A1 | 3/2005 | Waltho et al. | 375/346 |
| 2005/0180520 A1 | 8/2005 | Kim et al. | |
| 2006/0146966 A1 | 7/2006 | Golanbari et al. | |
| 2006/0159002 A1 | 7/2006 | Kim et al. | |
| 2006/0178157 A1 | 8/2006 | Gebara et al. | |
| 2006/0291598 A1 | 12/2006 | Gebara et al. | |
| 2007/0064923 A1 | 3/2007 | Schmukler et al. | |
| 2007/0092265 A1 | 4/2007 | Vrazel et al. | |

| | | | |
|---|---|---|---|
| 2007/0171998 | A1 | 7/2007 | Hietala et al. |
| 2007/0253495 | A1 | 11/2007 | Kim |

FOREIGN PATENT DOCUMENTS

| | | |
|---|---|---|
| EP | 0 584 865 B1 | 3/2000 |
| GB | 2 223 369 A | 4/1990 |
| GB | 2 306 066 A | 4/1997 |
| JP | 62082659 | 10/1988 |
| JP | 1990000063162 | 11/1991 |
| JP | 04187738 | 7/1992 |
| JP | 08079186 A | 3/1996 |
| WO | WO 99/45683 A1 | 9/1999 |
| WO | WO 01/41346 A2 | 6/2001 |
| WO | WO 02/067521 A1 | 8/2002 |
| WO | WO 02/082694 A1 | 10/2002 |
| WO | WO 02/091600 A2 | 11/2002 |
| WO | WO 03/071731 A1 | 8/2003 |
| WO | WO 03/077423 A2 | 9/2003 |
| WO | WO 03/092237 A1 | 11/2003 |
| WO | WO 2004/008782 A2 | 1/2004 |
| WO | WO 2004/045078 A2 | 5/2004 |
| WO | WO 2004/088857 A2 | 10/2004 |
| WO | WO 2005/018134 A2 | 2/2005 |
| WO | WO 2005/050896 A2 | 6/2005 |
| WO | WO 2006/065883 A2 | 6/2006 |

OTHER PUBLICATIONS

Borjak et al.; *High-Speed Generalized Distributed-Amplifier-Based Transversal-Filter Topology for Optical Communication Systems*; IEEE Transactions on Microwave Theory and Techniques; vol. 45, No. 8; Aug. 1997; pp. 1453-1457.

Buchali et al.; *Fast Eye Monitor for 10 Gbit/s and its Application for Optical PMD Compensation*; Optical Society of America; (2000); pp. TuP5-1-TuP1-3.

Cartledge et al.; *Performance of Smart Lightwave Receivers With Linear Equalization*; Journal of Lightwave Technology; vol. 10, No. 8; Aug. 1992; pp. 1105-1109.

Chi et al.; *Transmission Performance of All-Optically Labelled Packets Using ASK/DPSK Orthogonal Modulation*; The 15$^{th}$ Annual Meeting of the IEEE Lasers and Electro-Optics Society, 2002; LEOS 2002; Nov. 10-14, 2002; vol. 1:51-52. The whole document.

Chiang et al.; *Implementation of STARNET: A WDM Computer Communications Network*; IEEE Journal on Selected Areas in Communications; Jun. 1996; vol. 14, No. 5; pp. 824-839.

Choi et al.; *A 0.18-µm CMOS 3.5-Gb/s Continuous-Time Adaptive Cable Equalizer Using Enhanced Low-Frequency Gain Control Method*; IEEE Journal of Solid-State Circuits; Mar. 2004; vol. 39, No. 3; pp. 419-425.

Cimini et al.; *Can Multilevel Signaling Improve the Spectral Efficiency of ASK Optical FDM Systems?*; IEEE Transactions on Communications; vol. 41, No. 7; Jul. 1993; pp. 1084-1090.

Enning et al.; *Design and Test of Novel Integrate and Dump Filter (I& D) for Optical Gbit/s System Applications*; Electronics Letters; (Nov. 21, 1991); vol. 27, No. 24; pp. 2286-2288.

Garrett, Ian; *Pulse-Position Modulation for Transmission Over Optical Fibers with Direct or Heterodyne Detection*; IEEE Transactions on Communications; vol. COM-31; No. 4; Apr. 1983; pp. 518-527.

Godin et al.; *A InP DHBT Technology for High Bit-rate Optical Communications Circuits*; IEEE; (1997); pp. 219-222.

Haskins et al.; *FET Diode Linearizer Optimization for Amplifier Predistortion in Digital Radios*; IEEE Microwave and Guided Wave Letters; vol. 10, No. 1; Jan. 2000; pp. 21-23.

Hranilovic et al.; *A Multilevel Modulation Scheme for High-Speed Wireless Infrared Communications*; IEEE; (1999); pp. VI-338-VI-341.

Idler et al.; *40 Gbit/s Quaternary Dispersion Supported Transmission Field Trial Over 86 km Standard Singlemode Fibre*; 24$^{th}$ European Conference on Optical Communication; Sep. 1998; pp. 145-147.

Jutzi, Wilhelm; *Microwave Bandwidth Active Transversal Filter Concept with MESFETs*; IEEE Transactions on Microwave Theory and Technique, vol. MTT-19, No. 9; Sep. 1971; pp. 760-767.

Kaess et al.; *New Encoding Scheme for High-Speed Flash ADC's*; IEEE International Symposium on Circuits and Systems; Jun. 9-12, 1997; Hong Kong; pp. 5-8.

Kaiser et al.; *Reduced Complexity Optical Duobinary 10-Gb/s Transmitter Setup Resulting in an Increased Transmission Distance*; IEEE Photonics Technology Letters; Aug. 2001; vol. 13; No. 8; pp. 884-886.

Kannangara et al.; *Adaptive Duplexer for Multiband Transreceiver*; Radio and Wireless Conference; Aug. 10-13, 2003; RAWCON '03; pp. 381-384.

Kannangara et al.; *Adaptive Duplexer for Software Radio*; Approximate Date: Nov. 11-13, 2002.

Kannangara et al.; *An Algorithm to Use in Adaptive Wideband Duplexer for Software Radio*; IEICE Transactions on Communications; Dec. 2003; vol. E86-B, No. 12; pp. 3452-3455.

Kannangara et al.; *Performance Analysis of the Cancellation Unit in an Adaptive Wideband Duplexer for Software Radio*; ATcrc Telecommunications and Networking Conference & Workshop, Melbourne, Australia, Dec. 11-12, 2003.

Lee et al.; *Effects of Decision Ambiguity Level on Optical Receiver Sensitivity*; IEEE Photonics Technology Letters; vol. 7, No. 19; Oct. 1995; pp. 1204-1206.

Marcuse, Dietrich; *Calculation of Bit-Error Probability for a Lightwave System with Optical Amplifiers and Post-Detection Gaussian Noise*; Journal of Lightwave Technology; vol. 9, No. 4; Apr. 1991; pp. 505-513.

Megherbi et al.; *A GaAs-HBT A/D Gray-Code Converter*; IEEE; (1997); pp. 209-212.

Nazarathy et al.; *Progress in Externally Modulated AM CATV Transmission Systems*; Journal of Lightwave Technology; vol. 11, No. 1; Jan. 1993; pp. 82-105.

Oehler et al.; *A 3.6 Gigasample/s 5 bit Analog to Digital Converter Using 0.3 µm AlGaAs-HEMT Technology*; IEEE; (1993); pp. 163-164.

Ohm et al.; *Quaternary Optical ASK-DPSK and Receivers with Direct Detection*; IEEE Photonics Technology Letters; Jan. 2003; vol. 15, No. 1; pp. 159-161.

Ohtsuki et al.; *BER Performance of Turbo-Coded PPM CDMA Systems on Optical Fiber*; Journal of Lightwave Technology; vol. 18; No. 12; Dec. 2000; pp. 1776-1784.

Ota et al.; *High-Speed, Burst-Mode, Packet-Capable Optical Receiver and Instantaneous Clock Recovery for Optical Bus Operation*; Journal of Lightwave Technology; vol. 12, No. 2; Feb. 1994; pp. 325-331.

Paul, et al.; *3 Gbit/s Optically Preamplified Direct Detection DPSK Receiver With 116 photon/bit Sensitivity*; Electronics Letters; vol. 29, No. 7; Apr. 1, 1993; pp. 614-615.

Penninckx et al.; *Optical Differential Phase Shift Keying (DPSK) Direct Detection Considered as a Duobinary Signal*; Proc. 27$^{th}$ Eur. Conf. on Opt. Comm. (ECOC'01—Amsterdam); vol. 3; Sep. 30 to Oct. 4, 2001; pp. 456-457.

Poulton et al.; *An 8-GSa/s 8-bit ADC System*; Symposium on VLSI Circuits Digest of Technical Papers; (1997); pp. 23-24.

Poulton et al.; *A 6-b, 4 GSa/s GaAs HBT ADC*; IEEE Journal of Solid-State Circuits; vol. 30, No. 10.; Oct. 1995; pp. 1109-1118.

Poulton et al.; *A 6-bit, 4 GSa/s ADC Fabricated in a GaAs HBT Process*; IEEE; (1994); pp. 240-243.

Prasetyo et al.; *Application for Amplitude Gain Estimation Techniques for Multilevel Modulation in OFDM Systems*; IEEE; (1998); pp. 821-824.

Rohde et al.; *Robustness of DPSK Direct Detection Transmission Format in Standard Fibre WDM Systems*; Electronics Letters; vol. 36, No. 17; Aug. 17, 2000; pp. 1483-1484.

Runge et al.; *High-Speed Circuits for Lightwave Communications*; 1999; World Scientific, pp. 181-184.

Shirasaki et al.; *Fibre Transmission Properties of Optical Pulses Produced Through Direct Phase Modulation of DFB Laser Diode*; Electronics Letters; vol. 24, No. 8; Apr. 14, 1988; pp. 486-488.

Su et al.: *Inherent Transmission Capacity Penalty of Burst-Mode Receiver for Optical Multiaccess Networks*; IEEE Photonics Technology Letters; vol. 6, No. 5; May 1994; pp. 664-667.

Vodhanel et al.; *Performance of Directly Modulated DFB Lasers in 10-Gb/s ASK, FSK, and DPSK Lightwave Systems*; Journal of Lightwave Technology; Sep. 1990; vol. 8, No. 9; pp. 1379-1386.

Wakimoto et al.; *Si Bipolar 2-GHz 6-bit Flash A/D Conversion LSI*; IEEE Journal of Solid-State Circuits; Dec. 1988; vol. 23, No. 6; pp. 1345-1350.

Walkin et al.; *A 10 Gb/s 4-ary ASK Lightwave System*; ECOC; 1997; pp. 255-258.

Walklin et al.; *Multilevel Signaling for Extending the Dispersion-Limited Transmission Distance in High-Speed, Fiber Optic Communication Systems*; IEEE; 1996; pp. 233-236.

Walklin et al.; *Multilevel Signaling for Increasing the Reach of 10 Gb/s Lightwave Systems*; IEEE Journal of Lightwave Technology; vol. 17; No. 11; Nov. 1999; pp. 2235-2248.

Wang et al.; *Multi-Gb/s Silicon Bipolar Clock Recovery IC*; IEEE Journal on Selected Areas in Communications; vol. 9, No. 5; Jun. 1991; pp. 656-663.

Webb, William T.; *Spectrum Efficiency of Multilevel Modulation Schemes in Mobile Radio Communications*; IEEE Transactions on Communications; vol. 43, No. 8; Aug. 1995; pp. 2344-2349.

Wedding et al.; *Multi-Level Dispersion Supported Transmission at 20 Gbit/s Over 46 km Installed Standard Singlemode Fibre*; $22^{nd}$ European Conference on Optical Communication; 1996; pp. 91-94.

Wedding et al.; *Fast Adaptive Control for Electronic Equalization of PMD*; Optical Society of America; (2000); pp. TuP4-1-TuP4-3.

Weger et al.; *Gilbert Multiplier as an Active Mixer with Conversion Gain Bandwidth of up to 17GHz*; Electronics Letters; $28^{th}$ Mar. 1991; vol. 27, No. 7; pp. 570-571.

Westphal et al.; *Lightwave Communications*; 1994; Thursday Afternoon/CLEO '94; pp. 337-338.

Williamson et al., *Performance Analysis of Adaptive Wideband Duplexer*; 2003 Australian Telecommunications, Networks and Applications Conference (ATNAC); Dec. 8-10, 2003.

Wilson et al.; *Predistortion of Electroabsorption Modulators for Analog CATV Systems at 1.55 μm*; Journal of Lightwave Technology; vol. 15, No. 9; Sep. 1997; pp. 1654-1662.

\* cited by examiner

METHOD AND SYSTEM FOR AUTOMATIC CONTROL IN AN INTERFERENCE CANCELLATION DEVICE

CROSS REFERENCE TO RELATED APPLICATIONS

This application claims the benefit of priority to and is a continuation-in-part of U.S. Nonprovisional patent application Ser. No. 11/302,896, entitled "Method and System for Reducing Signal Interference, filed on Dec. 14, 2005 now U.S. Pat. No. 7,522,883 in the name of Gebara et al.

U.S. Nonprovisional patent application Ser. No. 11/302,896 claims priority to U.S. Provisional Patent Application Ser. No. 60/635,817, entitled "Electromagnetic Interference Wireless Canceller," filed on Dec. 14, 2004 in the name of Gebara et al.

This application further claims the benefit of priority to U.S. Provisional Patent Application Ser. No. 60/689,467, entitled "Automatic Gain and Phase Control for an Interference Cancellation Device," filed on Jun. 10, 2005 in the name of Kim et al.

This application further claims the benefit of priority to U.S. Provisional Patent Application Ser. No. 60/696,905, entitled "Control Loop for Active Noise Canceller in Wireless Communication System," filed on Jul. 6, 2005 in the name of Schmukler et al.

This application further claims the benefit of priority to U.S. Provisional Patent Application No. 60/719,055, entitled "Method and System for Embedded Detection of Electromagnetic Interference," filed on Sep. 21, 2005 in the name of Stelliga et al.

This application further claims the benefit of priority to U.S. Provisional Patent Application No. 60/720,324, entitled "Method and System for Reducing Power Consumption in an Interference Cancellation Device of a Wireless System," filed on Sep. 23, 2005 in the name of Stelliga et al.

The entire contents of each of the above listed priority documents are hereby incorporated herein by reference.

FIELD OF THE INVENTION

The present invention relates to the field of communications, and more specifically to improving signal fidelity in a communication system by compensating for interference that occurs between two or more communication channels.

BACKGROUND

Radios used in wireless communications systems generally receive small signals and transmit large signals. There are many sources of noise in a modern wireless communication system. They include the transmitter and possibly multiple transmitters for devices with multiple radios operating simultaneously. Insufficient isolation between transmitter and receiver, crosstalk from unwanted sources, broadband noise from digital buses such as those traveling from a processor to a display device, and side lobes of these and other signals can all contribute to the interfering noise in the system. Representative types of interference may be generally characterized as electromagnetic interference (EMI) or insufficient isolation. In EMI, the interference is a radiated electromagnetic wave that is coupled into the receiver. When components have insufficient isolation, interfering signals or noise may couple through electrical components, air, or printed circuit board (PCB) traces.

Since wireless communication systems transmit and receive electromagnetic (EM) signals to communicate data, EMI can be a significant concern. Examples of such systems include mobile phones, wireless e-mail services, pager services, wireless data networks (e.g. networks conforming to IEEE standards 802.11a/b/g/n), satellite links, terrestrial microwave, wireless peripheral links (e.g. Bluetooth) cable television, broadcast television, and global position systems (GPSs). Receivers within wireless communication devices may undesirably receive interfering signals along with the intended radio signal. The radio signal that was intended to be received can be termed the "victim" signal. The signal that imposes the interference can be termed the "aggressor" or "aggressing" signal. Thus, EMI often degrades the signal fidelity of the victim signal and impairs radio reception quality. Exemplary sources of interference can include, among others, other radio circuits within the device itself, high-speed buses carrying data within the device itself, signals coupling from other circuits within the device due to poor isolation, and EMI originating outside the device. Even when the communication bands of the victim and aggressor do not directly overlap one another, out-of-band aggressor signals may corrupt the victim signal, particularly if the aggressor signal is significantly more intense than the victim signal.

EMI may become problematic when two or more radio services are operated on the same device, such as a mobile phone handset with multiple bands or services. In this situation, the transmitted signal for a first radio service may interfere with the received signal for a second radio service. Such interference can occur even when two or more services utilize different frequency bands as a result of the transmitted power of the first signal being significantly larger than the received power of the second signal. Detrimental interference also may occur when insufficient suppression of sideband signals causes energy leakage from one RF system into a second RF system. Consequently, even a small fraction of the first, transmitted signal can leak into the second, received signal to cause an interference problem.

In addition to EMI arising from an alternate wireless service, EMI may arise from high-speed circuitry in close proximity to the receiver. In mobile phones, for example, a high-speed bus may carry display data from a processor to a high-resolution display. In many cases, increasing the resolution of the display is desirable from a product feature perspective. However, the faster bus data rates associated with increased display resolution typically generate a higher level of radiated EMI, thereby degrading the victim signal of the mobile phone. High-speed buses may include buses carrying high digital data rates, buses with signals that switch rapidly, or buses with signals that switch frequently. That is, very fast rise and fall times of bus signals may be as significant as the actual amount of data throughput.

With respect to the digital systems within wireless devices, a device designer may seek to increase the data rate or bandwidth of each lane, conductor, or channel. The designer might seek increased bandwidth to support higher display resolution, higher display update rates, higher camera resolutions, increased digital memory, integration of handheld computer features, integration of music and video functionalities, etc. A faster data rate may also result from designing a bus with a reduced number of data, address, or control lanes. Reducing bus lanes typically involves increasing the data rate on the remaining lanes to support the existing aggregate throughput. Thus, improvements in displays, cameras, and other subsystems can increase EMI and degrade the performance of the radio receiver in a mobile phone system.

The impact of EMI can increase when high-speed circuitry is routed in close proximity to a radio receiver. In particular, a high-speed signal can cause the emission of EMI. When such a high-speed signal is routed in close proximity to a radio receiver, the receiver can undesirably receive the interference along with the radio signal that is intended for reception.

High-speed buses emitting interference can take multiple forms. For instance, in the mobile phone application described above, the bus carrying the display data is often embodied as a flex cable. A flex cable may also be referred to as a flex circuit or a ribbon cable. A flex cable typically comprises a plurality of conductive traces or channels (typically copper conductors) embedded, laminated, or printed on or in a flexible molding structure such as a plastic or polymer film or some other dielectric or insulating material.

A third source of EMI can be circuits or circuit elements located in close proximity to a victim channel or radio. Like the signals on the high-speed buses, signals flowing through a circuit or circuit component can emit EMI. Representative examples of circuits that can emit a problematic level of EMI include voltage controlled oscillators (VCOs), phased-lock loops (PLLs), switch-mode circuits, amplifiers, and other active or passive circuits or circuit components.

Furthermore, a designer may wish to improve the radio reception of a wireless system, for example to facilitate reception of weak radio signals in a mobile phone application. In other words, improving reception of low-power signals or noisy signals provides another motivation to reduce or to otherwise address interference or crosstalk. A weak radio signal might have less intensity than the noise level of the EMI, for example. Thus, reducing EMI may facilitate reception of weaker radio signals or enable operating a mobile phone or other radio in a noisy environment.

Conventional passive filters are often not effective in contending with EMI. In such instances, an active canceller can help mitigate the interference. One technique for actively canceling signal interference involves sampling the aggressor signal and processing the acquired sample to generate an emulation of the interference, in the form of a simulated or emulated interference signal. A canceller circuit subtracts the emulated interference signal from the received victim signal, which has been corrupted by the interference, to yield a compensated or corrected signal with reduced interference.

Conventional technologies for sampling the aggressor signal are frequently inadequate. Distortion or error associated with sampling the aggressor signal can lead to a diminished match between the interference and the emulation of the interference. One technique for obtaining a sample of the aggressor signal is to directly tap the aggressor line. However, the resulting loss of power on the transmitted aggressor line is detrimental in many applications, such as in hand-held radios, cell phones, or handset applications. Directly tapping into the aggressor line can also adversely impact system modularity.

The interference sampling system should generally be situated in close proximity to the source or sources of interference. This configuration helps the sampling system obtain samples of the interference signals while avoiding sampling the radio signal. Inadvertent sampling of the radio signal could result in the canceller circuit removing the victim radio signal from the compensated signal, thereby degrading the compensated signal. In other words, conventional technologies for obtaining an interference sample often impose awkward or unwieldy constraints on the location of the sampling elements.

For handset applications, the sampling system should generally be compatible with the handset architecture and its compact configuration. Radio handsets, such as mobile phones, typically contain numerous components that design engineers may struggle to integrate using conventional design technologies. Strict placement requirements of conventional interference sampling systems frequently increase system design complexity. In other words, conventional interference sampling systems often fail to offer an adequate level of design flexibility as a result of positioning constraints.

Another shortcoming of most conventional technologies for active EMI cancellation involves inadequate management of power consumption. An active EMI cancellation system may consume an undesirably high level of electrical power that can shorten battery life in handset applications. That is, conventional EMI cancellation technology, when applied in a cellular telephone or other portable device, often draws too much power from the battery or other energy source of the portable device. Consumers typically view extended battery life as a desirable feature for a portable wireless communication product. Thus, reducing power consumption to extend usage time between battery recharges is often a priority to design engineers.

To address these representative deficiencies in the art, what is needed is an improved capability for addressing, correcting, or canceling signal interference in communication systems. A need exists for a compact system for sampling an aggressor signal and/or associated interference in a communication system, such as a cellular device. A further need exists for an interference sampling system that affords an engineer design modularity or flexibility. Another need exists in the art for a means to control the gain and phase of the canceling signal with active EMI cancellers. There is a further need for such gain and phase compensation to be continuously adaptive in nature to address any time-varying changes in the aggressor signal or any changes in the manner in which the aggressor signal couples to the victim signal. There is another need in the art for active EMI canceller control loops that avoid interference with the desired receive signal or that avoid adding extra noise to the received signal. Yet another need exists for a system that reduces or suppresses signal interference while managing power consumption. A capability addressing one or more of these needs would support operating compact communication systems at high data rates and/or with improved signal fidelity.

SUMMARY

The present invention supports compensating for signal interference, such as EMI or crosstalk, occurring between two or more communication channels or between two or more communication elements in a communication system. Compensating for interference can improve signal quality or enhance communication bandwidth or information carrying capability.

In one aspect of the present invention, a method or system can apply active noise cancellation to mitigate, suppress, reduce, cancel, or otherwise address interference, such as EMI. Active noise cancellation can involve simulating, mimicking, or emulating undesirable interference, thereby generating an emulated interference signal resembling the actual interference that the aggressor signal has imposed on the victim signal. Subtracting the emulated interference from the victim signal can result in the emulated interference and the actual interference canceling or negating one another. In other words, a noise cancellation system can address interference by creating simulated interference and applying, typically via subtraction, that simulated interference to a signal or channel that suffers from actual interference. Generating the emulated interference and/or applying emulated interference to the victim signal can comprise matching one or more signal parameters of the emulated interference with one or more corresponding signal parameters of the actual interference. The systems, devices, operations, or methods through which the interference cancellation system generates the emulated interference can be referred to as an emulation channel.

The interference cancellation system can control, manipulate, adjust, or optimize various parameters of the emulation channel, such as gain, amplification, phase, delay, filtering variables, center frequency, pole-zero locations, etc. The interference cancellation system can vary one or more of these parameters in a manner that seeks to minimize the energy, or to control some other attribute, of the residual interference that remains on the victim signal after cancellation. Moreover, the interference cancellation system can comprise a feedback control loop, or some circuit, that updates or dynamically adjusts the emulation parameters based on feedback from or monitoring of the victim signal. The dynamic adjustments can provide interference suppression while compensating for fluctuations in the communication system, the operating environment, the aggressor signal, or some other operating factor or condition. A control circuit that implements the dynamic adjustments can have at least two modes of operation. In a first mode, the control circuit can adjust a first signal parameter, such as amplitude or gain. In a second mode, the control circuit can adjust a second signal parameter, such as phase or delay.

The discussion of interference cancellation presented in this summary is for illustrative purposes only. Various aspects of the present invention may be more clearly understood and appreciated from a review of the following detailed description of the disclosed embodiments and by reference to the drawings and any claims that may follow. Moreover, other aspects, systems, methods, features, advantages, and objects of the present invention will become apparent to one with skill in the art upon examination of the following drawings and detailed description. It is intended that all such aspects, systems, methods, features, advantages, and objects are to be included within this description, are to be within the scope of the present invention, and are to be protected by any accompanying claims.

Figure 1:
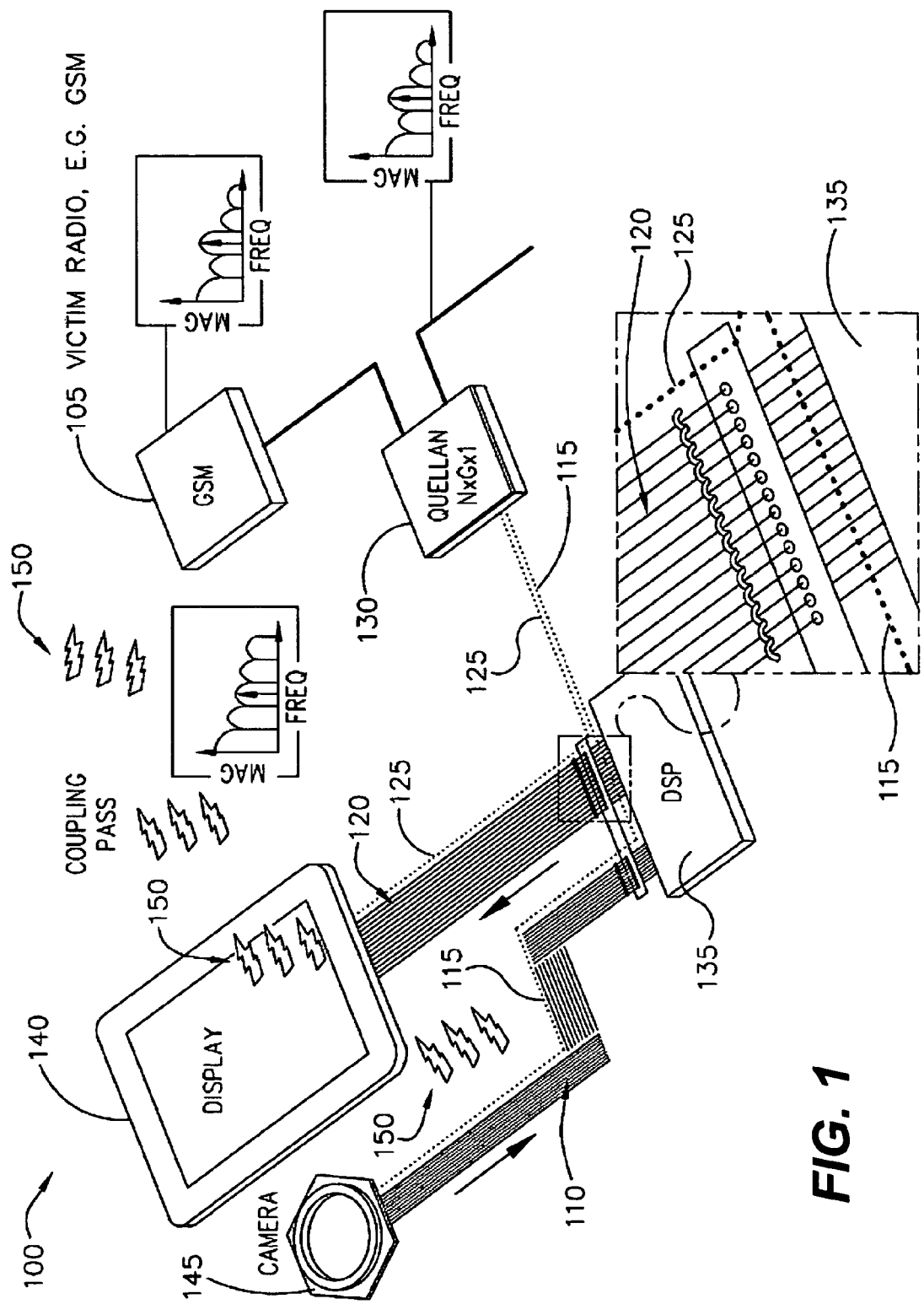
FIG. 1 illustrates a functional block diagram of a communication system comprising an interference sensor coupled to an interference compensation circuit according to an exemplary embodiment of the present invention.

Many aspects of the invention can be better understood with reference to the above drawings. The components in the drawings are not necessarily to scale, emphasis instead being placed upon clearly illustrating the principles of exemplary embodiments of the present invention. Moreover, in the drawings, reference numerals designate corresponding, but not necessarily identical, parts throughout the different views.

DETAILED DESCRIPTION OF EXEMPLARY EMBODIMENTS

The present invention supports compensating for signal interference, such as EMI or crosstalk, occurring between two or more communication channels or between two or more communication elements in a communication system. Compensating for interference can improve signal quality or enhance communication bandwidth or information carrying capability. A communication channel may comprise a transmission line, a printed circuit board (PCB) trace, a flex circuit trace, an electrical conductor, a waveguide, a bus, a communication antenna, a medium that provides a signal path, or an active or passive circuit or circuit element such as a filter, oscillator, diode, VCO, PLL, amplifier, digital or mixed signal integrated circuit. Thus, a channel can comprise a global system for mobile communications (GSM) device, a processor, a detector, a source, a diode, an inductor, an integrated circuit, a connector, a circuit trace, or a digital signal processing (DSP) chip, to name only a few possibilities.

Moreover, exemplary embodiment of the present invention can support canceling, correcting, addressing, or compensating for interference, EMI, or crosstalk associated with one or more communication paths in a communication system, such as a high-speed digital data communication system in a portable radio or a cellular telephone. An interference sensor can obtain a signal representation or a sample of an interference signal or a communication signal that imposes interference or of the interference. The interference sensor can be integrated into a structure, such as a flex cable or a circuit board, that supports or comprises at least one conductor that imposes or receives the interference. In an exemplary embodiment, the interference sensor can be a dedicated conductor or circuit trace that is near an aggressor conductor, a victim conductor, or an EM field associated with the EMI. The sensor can be coupled to an interference compensation circuit. The interference compensation circuit can have at least two modes of operation. In the first mode, the circuit can actively generate or output a correction signal. In the second mode, the circuit can withhold generating or outputting the correction signal, thereby conserving power and may also avoid inadvertently degrading the signal-to-noise ratio of the involved communication signals.

In one exemplary embodiment of the present invention, a sensor can be disposed in the proximity of one or both channels. From this position, the sensor can obtain a sample or a representation of the interference or of the aggressor signal, which produced, induced, generated, or otherwise caused the interference. The sensor can comprise a sensing or sampling channel that obtains the sample. As an aggressor channel transmits communication signals, such as digital data or analog information, producing interference on a victim channel, the sensing channel can sample the aggressing communication signals and/or the interference. The sensing channel can be, for example, a conductor dedicated to obtaining a representation of the aggressing signal or the interference. Such a sensing conductor can be near a conductor carrying aggressing signals, near a conductor carrying victim signals, or in an EM field associated with the aggressing channel and/or the victim channel. The sensing conductor can be physically separated from the aggressing conductor while coupling to the aggressing conductor via an inductive field, a magnetic field, an electrical field, and/or an EM field. That is, the sensing conductor can obtain a sample of the aggressor signal without necessarily physically contacting or directly touching the aggressor conductor, for example.

In one exemplary embodiment of the present invention, a circuit that cancels, corrects, or compensates for or otherwise addresses communication interference can have at least two modes of operation. The interference compensation circuit could be coupled to the sensor, for example. In the first mode, the interference compensation circuit can generate, produce, or provide a signal that, when applied to a communication signal, reduces interference associated with that communication signal. In the second mode, the interference compensation circuit can refrain from producing or outputting the interference correction signal. The second mode can be viewed as a standby, idle, passive, sleep, or power-saving mode. Operating the interference compensation circuit in the second mode can offer a reduced level of power consumption.

In one exemplary embodiment of the present invention, a method or system can cancel EMI by matching the amplitude, phase, or delay of an emulated aggressor signal to the actual aggressor signal incurred by the victim. The method can be based on an analog control loop that minimizes the energy of the residual or cancelled aggressor signal. In other words, the gain and phase compensation of the emulation path may be adjusted to minimize the energy in the remaining aggressor signal after cancellation.

As an alternative to manipulating emulation parameters to drive down the energy of the interference signal, the parameters can be adjusted based on a data rate or a bit error rate. That data rate or bit error rate can be the data rate or the bit error rate of the received victim signal, for example. In one exemplary embodiment, the parameters are controlled according to signal integrity or reception strength. For example, the number of reception "bars" on a cellular telephone can provide control feedback.

In one exemplary embodiment, an inter-integrated circuit (I2C) bus or a serial peripheral interface (SPI) bus can be used for adaptation of the cancellation system. Thus, the emulation parameters can be varied based on information transmitted over an I2C bus or an SPI bus.

The gain and phase of the emulation channel are two parameters that may be controlled in a cancellation device. The emulation channel may also control delay or other emulation filter parameters. The control loop can work to minimize the energy of the residual aggressor after cancellation. This method of control is scalable to control a varying number of emulation channel parameters. The gain and phase of the emulation channel are exemplary parameters that can be controlled. Other parameters that might be controlled are delay and emulation filter parameters, such as center frequency or pole-zero locations.

In one exemplary embodiment of the present invention, a high-impedance tap can directly monitor a victim channel that is subject to detrimental interference. Accordingly, the tap can provide feedback to an interference cancellation device, or a controller thereof. In one exemplary embodiment, a single set of RF components support two or more signal sampling operations. Such dual-use may be advantageous in that offsets between multiple sets of RF components or multiple sampling points can be eliminated, thereby reducing calibration requirements. Employing a single RF path may also significantly reduce power consumption. In one exemplary embodiment, a scalable method can control the gain, phase, and other emulation channel parameters as required.

Turning to discuss each of the drawings presented in FIGS. 1-20, in which like numerals indicate like elements, an exemplary embodiment of the present invention will be described in detail.

Referring now to FIG. 1, this figure illustrates the interference phenomenon in a mobile phone system 100 where a GSM radio receiver 105 can be aggressed by one or more EMI sources. Specifically, FIG. 1 illustrates two such exemplary EMI sources 110 and 120, each emitting interference 150. One EMI source is a high-speed bus 120 carrying data from a DSP chip 135 to a high-resolution display 140. The other EMI source is a high-speed bus 110 carrying data from a camera imaging sensor 145 to the DSP chip 135. The imaging sensor 145 may comprise a charge coupled device (CCD) camera element or a complementary metal oxide semiconductor (CMOS) camera element.

Increasing the data rate or bandwidth of each lane, conductor, or channel of the display and camera busses 110 and 120 is often desirable. This desire may be motivated by a need to support higher display/camera resolution, which entails faster throughput commensurate with increasing the number of image pixels. This desire may also be motivated by a desire to reduce the number of data lanes in the buses 110 and 120, thereby involving an increase in the data rate on the remaining lanes, or bus lines, to support the existing aggregate throughput. Thus, improvements in the display 140 or camera system 145 (e.g. higher resolution or condensed communication bus) can degrade the performance of the radio receiver 105 in the mobile phone system 100.

Furthermore, improving reception of low-power signals or noisy signals provides another motivation to reduce or to otherwise address interference 150 or crosstalk. A weak radio signal might have less intensity than the noise level of the EMI 150, for example. Thus, it is desired to reduce the EMI 150 to facilitate reception of weaker radio signals or to enable operating a mobile phone or other radio in a noisy environment.

The communication system 100 comprises an interference compensation or correcting circuit 130, depicted in the exemplary form of an integrated circuit 130. The interference compensation circuit 130 delivers an interference compensation signal into or onto a channel that is a recipient of interference, to cancel, mitigate, or otherwise compensate for the received interference. The interference compensation signal is derived or produced from a sample of an aggressor communication signal that is propagating on another channel, generating the incurred interference or crosstalk.

The interference compensation circuit 130 can be coupled between the source 110 and 120 of the interference 150 and the victim device 105 that suffers from the interference 150. In this configuration, the interference compensation circuit 130 can sample or receive a portion of the signal that is causing the interference and can compose the interference compensation signal for application to the victim device 105 that is impacted by the unwanted interference 150. In other words, the interference compensation circuit 130 can couple to the channels 110, 120 that are causing the interference 150, can generate an interference compensation signal, and can apply the interference compensation signal to the recipient 105 of the interference to provide interference cancellation, compensation, or correction.

A battery, not shown on FIG. 1, typically supplies energy or power to the interference compensation circuit 130 as well as the other components of the system 100. As an alternative to a battery, a fuel cell or some other portable or small energy source can supply the system 100 with electricity. As discussed in more detail below, the system 100 and specifically the interference compensation circuit 130 can be operated in a manner that manages battery drain.

The interference compensation circuit 130 can generate the interference compensation signal via a model of the interference effect. The model can generate the interference compensation signal in the form of a signal that estimates, approximates, emulates, or resembles the interference signal. The interference compensation signal can have a waveform or shape that matches the actual interference signal. A setting or adjustment that adjusts the model, such as a set of modeling parameters, can define characteristics of this waveform.

The interference compensation circuit 130 receives the signal that is representative of the aggressor signal (or alternatively of the interference itself) from a sensor 115, 125 that is adjacent one or both of the EMI producing data busses 110, 120. In an exemplary embodiment, the sensors 115, 125 comprise conductors, associated with one or both of the data bus channels 110, 120. The sensors 115, 125 are dedicated to obtaining a sample of the aggressor signal. For example, the data bus 110 can have a plurality of conductors that transmit data between the camera 145 and the DSP chip 135 and at least one other conductor that senses, sniffs, or samples the aggressor signal, or an associated EM or EMI field, rather than carrying data for direct receipt. Moreover, one of the data bus conductors can function as a sensor during a time interval when that specific conductor is not purposefully conveying data.

In an exemplary embodiment, the sensors 115, 125 are integrated into a common structure to which the conductors of the data bus 110, 120 adhere or are attached. For example, the sensor 115, 125 can be attached to, or part of, a flex cable. In one exemplary embodiment, the sensor 115, 125 comprises a conductive trace deposited on the flex cable. In one exemplary embodiment, the sensors 115, 125 couple to the communication signals propagating on the data buses 110, 120 via the EM field of those signals. For example, the coupling may be via induction rather than through a direct connection. Thus, the sensors 115, 125 can be isolated from the aggressor channel below a threshold frequency and coupled to the aggressor channel above a threshold frequency. Moreover, the sensors 115, 125 can be isolated from the aggressor channel below a threshold voltage and coupled to the aggressor channel above a threshold voltage.

In one exemplary embodiment of the present invention, the sensors 115, 125 comprises an interference sampler located in close proximity to an interference source. In another exemplary embodiment of the present invention, the interference compensation circuit 130 samples its reference signal from a conductor that is in the vicinity of a victim antenna. In yet another exemplary embodiment of the present invention, the interference sensor 115, 125 comprises a sampling mechanism embedded as a lane within the bus path 110, 120 of the interference source. For example, the sampling mechanism can comprise an additional conductive line running parallel to the other data lines in a flex cable, or in a rigid printed circuit board. Embedding the sampling mechanism can provide compact size, design flexibility, modularity, signal integrity, and minimal power draw from the sensed line, which are useful attributes for a successful sampling mechanism and EMI canceller or interference cancellation/compensation system.

Embedding or integrating the sensor 115, 125 or sampling mechanism in a unitary, monolithic, or integrated structure that comprises the bus path 110, 120 provides close proximity between the sensor 115, 125 and the interference source or sources. The resulting close proximity facilitates strong sampling of the interference relative to the radio signal.

Embedding or integrating the sensor 115, 125 with the bus path 110, 120 offers the system designer (and PCB board designer in particular) design flexibility. For example, the design engineer can be freed from the constraint of allocating board space near the interference source for the sampling mechanism, as would be required for an antenna implementation. The system designer can receive relief from the task of designing an antenna according to one or more specific reception requirements, such as a field pattern and a frequency range.

An integrated, or embedded, sensor solution based on dedicating a conductor 115, 125 of a multi-conductor bus 110, 120 to sensing can have an inherent capability to receive the EMI interference. The inherent receptivity can mirror the inherent emission properties of the other conductors that generate interference. In other words, since emission and reception are typically reciprocal phenomena, configuring the sensing conductor to have a form similar to the radiating conductor (aggressor) can provide inherent reception of the EMI frequencies of interest.

In one exemplary embodiment of the present invention, the embedded interference sensor 115, 125 can run, extend, or span the entire length of the data bus 110, 120 that has data lines emitting the aggressing EMI.

In one exemplary embodiment of the present invention, an interference sensing conductor 115 can extend a limited portion of the total span of the data bus 110, 120, thereby helping the data bus 110, 120 maintain a compact width. Another exemplary embodiment which can minimize the width of the data bus has the sampling mechanism 115, 125 crossing over or under the data lines 110, 120. The crossing can be a perpendicular crossing. The sensing conductor and the data conductors can form an obtuse angle or an acute angle, for example.

As illustrated in FIG. 1, the sensing conductor 115, 125 can be disposed at a terminal end of the data bus 110, 120. For example, the sensing conductor 115 can comprise a conductive line near the electrical connection ports between the DSP chip 135 and a flex cable that comprises the data bus 110. Such a conductor can extend over, under, and/or around the bus, for example as a conductive band.

In one exemplary embodiment of the present invention, the embedded interference sensor 115 receives EMI interference not only from a primary element, such as its associated data bus 110, but also from other sources on the handset, such as the display 140, the camera 145, the DSP 135, etc. Thus, a single sensor 115 can sample multiple sources of interference to support correcting the interference from two or more sources via that single sensor and its associated interference compensation circuit 130.

In one exemplary embodiment of the present invention, the interference compensation circuit 130 samples its reference signal (i.e. the aggressor source) from a conducting element 115, 125 that receives radiated EMI 150. This sampling approach can sense the EMI 150 (or a filtered version thereof), or the aggressor signal in a non-intrusive manner. Specifically, the aggressor data line/source can remain essentially undisturbed physically. The data bus 110, 120 can function with little or no loss of power associated with the sensor 115, 125 that is coupled to thereto via inductive or capacitive coupling, typically without physical contact or direct electrical contact. That is, a dielectric material can separate the sensing conductor 115, 125 from the aggressor conductor, while providing inductive, capacitive, or EM coupling.

After sampling the reference signal, the interference compensation circuit 130 generates a compensation or cancellation signal which is adjusted in magnitude, phase, and delay such that it cancels a substantial portion of the interference signal coupled onto the victim antenna. In other words, the reference signal, which comprises the sample, is filtered and processed so it becomes a negative of the interference signal incurred by the received victim signal. The parameters of the magnitude, phase, and delay adjustment are variable and can be controlled to optimize cancellation performance.

Figure 2:
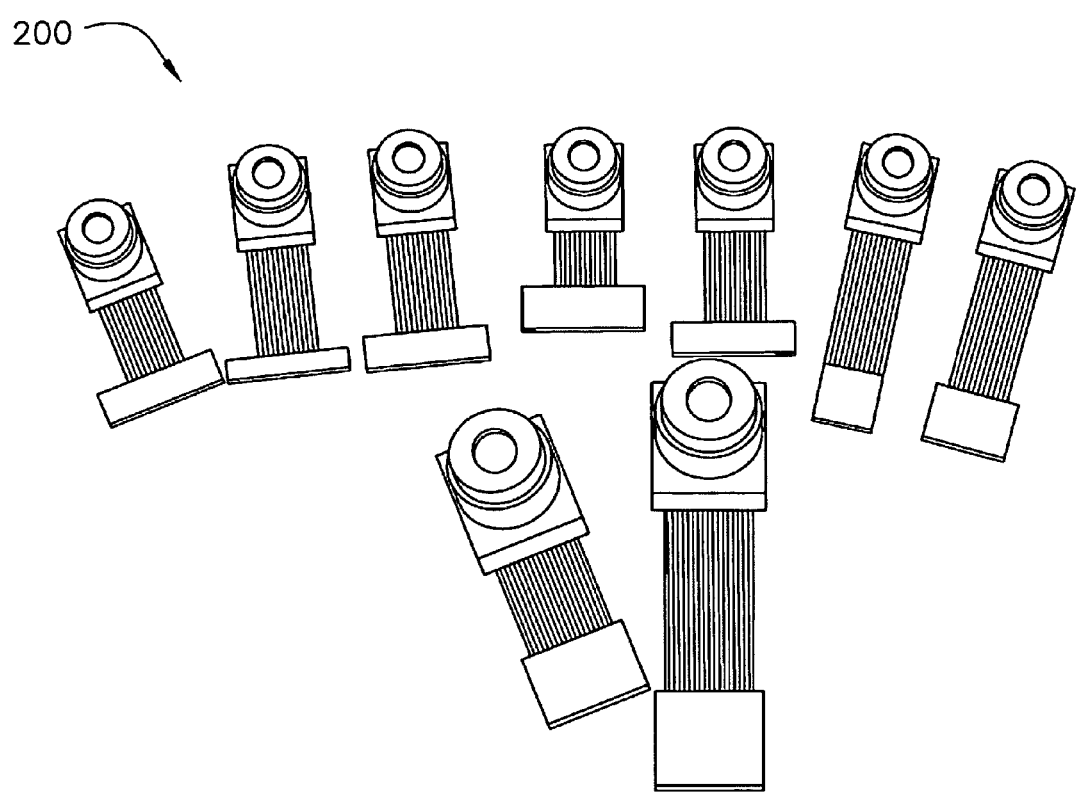
FIG. 2 illustrates flex circuits that can comprise an integral interference sensor according to an exemplary embodiment of the present invention.

Turning now to FIG. 2, this figure illustrates several flex cables 200 any of which could comprise the data buses 110 and 120 inside a mobile phone or other electronic communications device according to one exemplary embodiment of the present invention. High-speed buses, such as 110 and 120, that generate EMI can take multiple forms, an example of which is a flex cable. Such a flex cable may also be referred to as a flex circuit, a flat cable, or a ribbon cable. A flex cable typically comprises a plurality of conductive traces or channels (typically copper conductors) embedded, laminated, or printed on or within a flexible molding structure such as a plastic or polymer film or some other dielectric or insulating material.

In one exemplary embodiment, the sensor 115, 125 comprises a conductive trace deposited on the flex cable 200. The sensors 115, 125 can be formed into or integrated with the flex cable 200 at the time that the flex cable 200 is manufactured, for example as a step in a manufacturing process that involves lithography. The flex cable 200 can alternatively be adapted following its manufacture, for example by adhering the sensor to the flex cable 200. That is, a conventional flex cable can be acquired from a commercial vendor and processed to attach the sensor 115, 125 to that cable.

Figure 3:
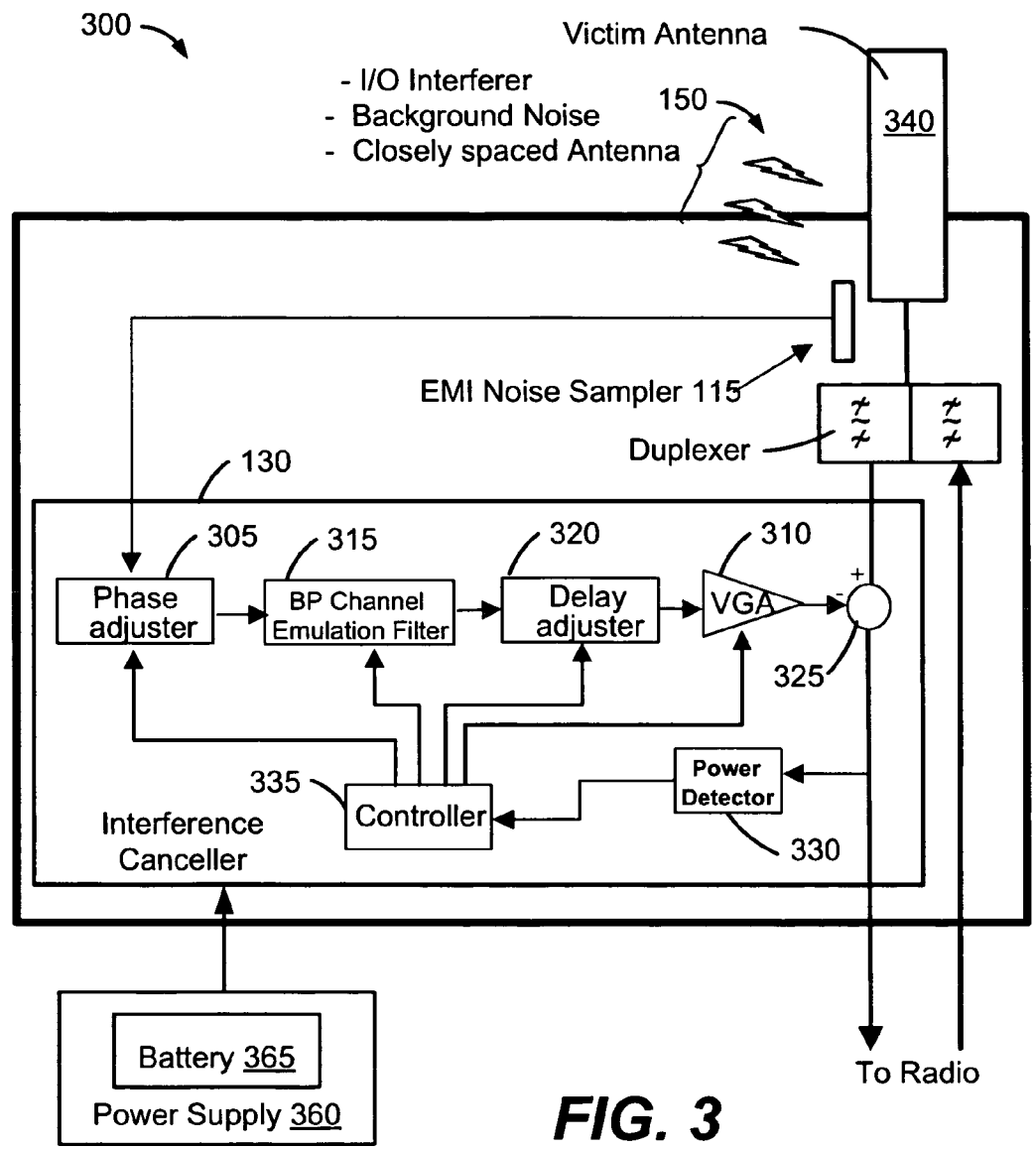
FIG. 3 illustrates a functional block diagram of an interference compensation circuit according to an exemplary embodiment of the present invention.

Turning now to FIG. 3, this figure illustrates a functional block diagram of an interference compensation circuit 130 according to an exemplary embodiment of the present invention. The interference compensation circuit 130 shown in FIG. 3 can be embodied in a chip format as an integrated circuit (IC), as illustrated in FIG. 1, or as a hybrid circuit. Alternatively, the interference compensation circuit 130 can comprise discrete components mounted on or attached to a circuit board or similar substrate. Moreover, in one exemplary embodiment of the present invention, the system 100 that FIG. 1 illustrates can comprise the system 300 of FIG. 3.

The interference compensation circuit 130 draws or obtains power or energy from the power supply 360, and its associated battery 365. As will be discussed in further detail below, the interference compensation circuit 130 can operate in a plurality of modes, each having a different level of consumption of battery energy.

FIG. 3 illustrates representative function blocks of the interference compensation circuit 130, including a Variable Phase Adjuster 305, a Variable Gain Amplifier (VGA) 310, an emulation filter 315, a Variable Delay Adjuster 320, a Summation Node 325, a power detector 330, and a controller 335.

The interference sensor 115 obtains a sample of the aggressor signal by, for example, coupling to the interfering field. The sampled interfering signal is fed through the compensation circuit 130 starting with the Variable Phase Adjuster 305. The phase adjuster may match, at the summation node 325, the phase of the emulated compensation signal with the phase of the interfering signal coupled onto the victim antenna 340. That is, the phase adjuster 305 places the phase of the compensation signal in phase with respect to the phase of the interference so that, when one is subtracted from the other, the compensation signal can cancel, or reduce, the interference. The cancellation can occur at the summation node 325 by subtracting the coupled signal onto the victim antenna 340 from the emulated signal generated by the interference compensation circuit 130 using the interfering signal as sampled at sensor 115.

In an alternative embodiment of the compensation circuit 130, the phase adjuster 305 can adjust the emulated signal phase to be 180 degrees out of phase with the interfering coupled signal. In that case, the summation node 325 adds the two signals rather than performing a subtraction.

In one exemplary embodiment, the phase shifter 305 comprises quadrature hybrids, and four silicon hyper-abrupt junction varactor diodes, along with various resistors, inductors and capacitors for biasing, pull-up, and signal conditioning. In another exemplary embodiment, the phase shifter 305 comprises an active circuit.

The optional emulation filter 315 can follow the variable phase shifter 305 in the cancellation path. The emulation filter 315 is typically a band pass (BP) filter that models the channel coupling and is also tunable in order to compensate for any drifts in channel center frequency.

In one exemplary embodiment, the emulation filter 315 comprises lumped elements and varactor diodes. The varactor diodes help change or control the center frequency of the emulation channel.

In one exemplary embodiment, the emulation filter 315 is a Finite Impulse Response (FIR) filter. The FIR filter can comprise taps and tap spacings that are extracted from or determined according to the coupling channel characteristics. In order to have robust cancellation for improved signal integrity of the communication system 100, the emulation filter 325 typically should match, in general, the coupling channel characteristics within the frequency band of interest.

The next stage of the cancellation path is the controllable delay adjuster 320, which may provide a match between the group delay of the coupled signal through the victim antenna 340 and the group delay of the emulated compensation signal at the summation node 325.

The output of the delay adjuster 320 feeds into the VGA 310. The VGA 310 can match the emulated signal amplitude to the amplitude of the interference signal at the summation node 325. Whereas the emulation filter 315 models the frequency characteristics (i.e. attenuation of frequencies relative to other frequencies) of the coupling channel, the VGA 310 applies a gain that is constant in magnitude across the frequency band of interest. Thus, the emulation filter 315 and the VGA 310 can function collaboratively to match the magnitude of the channel's coupling response on an absolute scale, rather than merely a relative scale.

The VGA 310 feeds the interference compensation signal to the summation node 325. In turn, the summation node 325 applies the compensation signal to the victim channel to negate, cancel, attenuate, or suppress the interference.

In one exemplary embodiment, the summation node 325 comprises a directional coupler. In an alternative exemplary embodiment, the summation node 325 comprises an active circuit such as a summer, which is typically a three-terminal device, or an output buffer, which is typically a two-terminal device.

For best performance, the summation node 325 should introduce essentially no mismatch to the victim antenna signal path. That is, the summation node 325 should ideally maintain characteristic impedance of the system 130. Nevertheless, in some situations, small or controlled levels of impedance mismatch can be tolerated. Avoiding impedance mismatch implies that the summation node 325 should have a high output impedance at the tap. Additionally, the summation node 325 should not add significant loss to the victim antenna receive path, as such loss can adversely affect receiver sensitivity. For illustrative purposes, this discussion of impedance matching references a system with a characteristic impedance of 50-ohms; however, exemplary embodiments of the present invention can be applied to systems with essentially any characteristic impedance.

While FIG. 3 illustrates the components 305, 310, 315, 320 is a particular order, that order is exemplary and should not be considered as limiting. Moreover, the order of those components 305, 310, 315, 320 is usually not critical and can be changed, or the components 305, 310, 315, 320 can be rearranged, while maintaining acceptable performance of the interference compensation circuit 130.

The interference compensation circuit 130, which can be viewed as an EMI canceller, offers flexibility in that the cancellation or compensation parameters can be adjusted or controlled to optimize the match of the emulated coupling channel to the actual EMI coupling channel. More specifically, the controller 335 and its associated power detector 330 provide a feedback loop for dynamically adjusting the circuit elements 305, 310, 315, 320 in a manner that provides robust correction of interference. A discussion of exemplary embodiments of the interference compensation circuit 130 follows below with reference to FIGS. 8-20.

Figure 4:
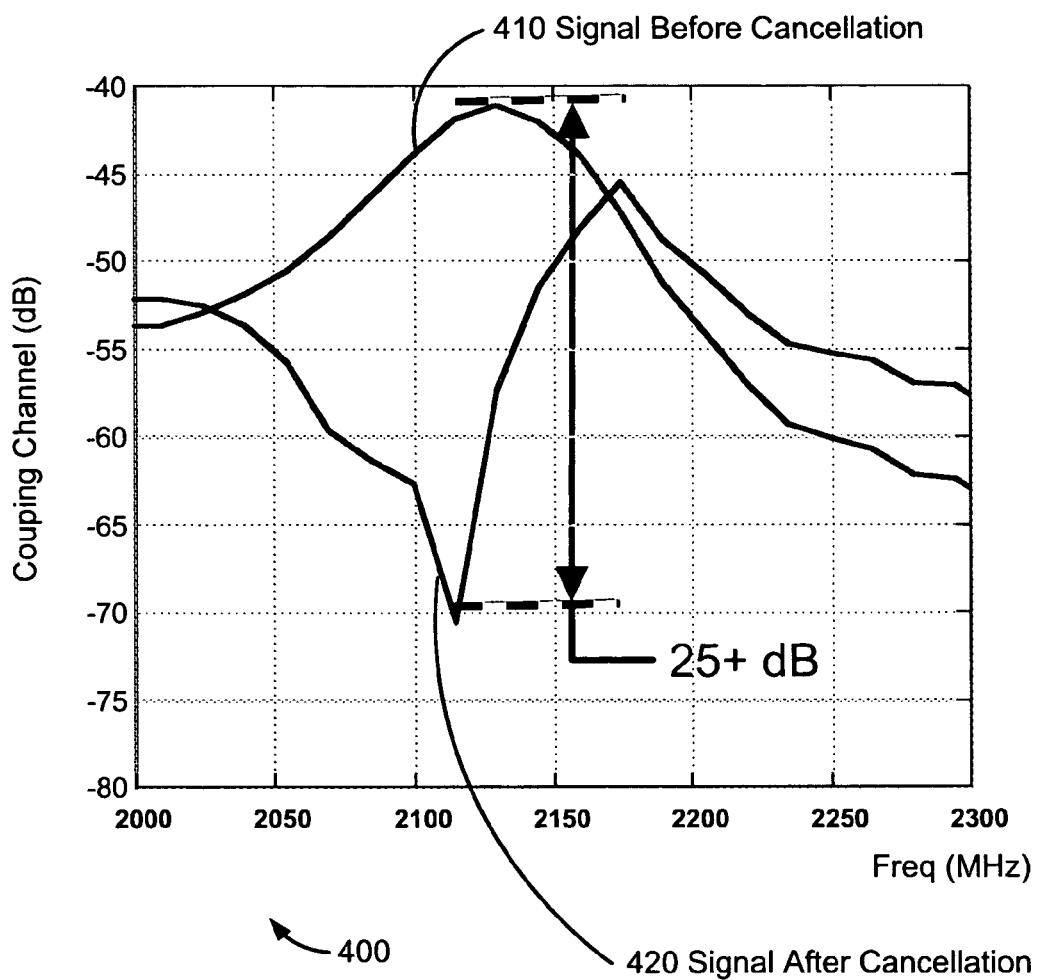
FIG. 4 illustrates a plot of spectral coupling for an interference signal prior to interference compensation overlaid on a plot of spectral coupling of the interference signal following interference compensation according to an exemplary embodiment of the present invention.

Turning now to FIG. 4, this figure illustrates a frequency plot 410 of the spectral content of an interference signal prior to interference compensation overlaid upon a plot 420 of the spectral content of the interference signal following interference compensation according to an exemplary embodiment of the present invention. That is, the graph 400 illustrates laboratory test data collected before and after an application of interference compensation in accordance with an exemplary embodiment of the present invention.

More specifically, FIG. 4 shows the coupling channel characteristics between a flex cable, similar to the flex cables 200 illustrated in FIG. 2 and discussed above, and a 2.11 gigahertz (GHz) antenna. The test data shows that, in laboratory testing, an exemplary embodiment of an interference compensation circuit 130 achieved a signal reduction greater than 25 dB in the frequency band between 2.1 GHz and 2.15 GHz.

Figure 5:
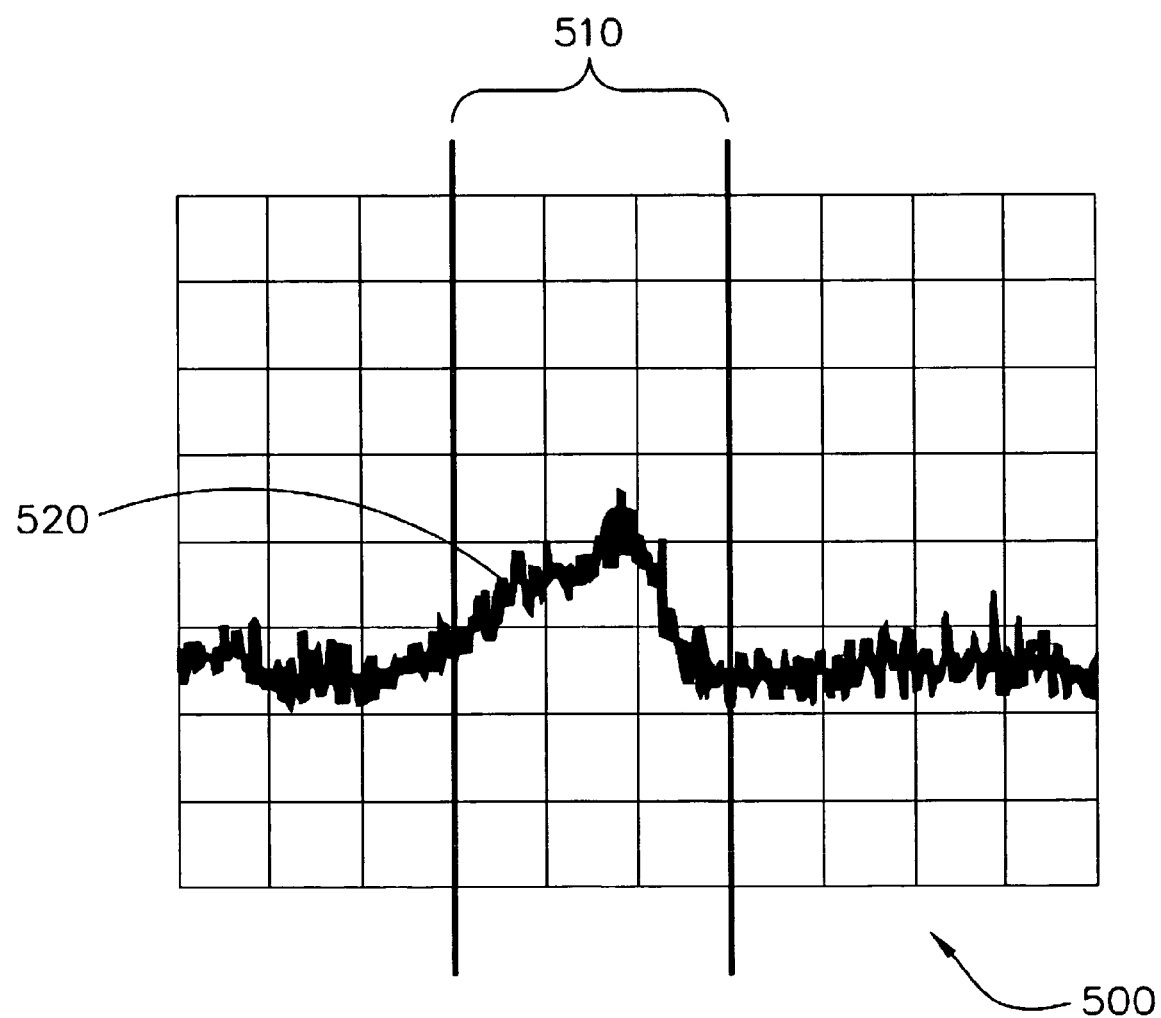
FIG. 5 illustrates a plot of the spectral energy in an interference signal prior to application of interference compensation according to an exemplary embodiment of the present invention.
Figure 6:
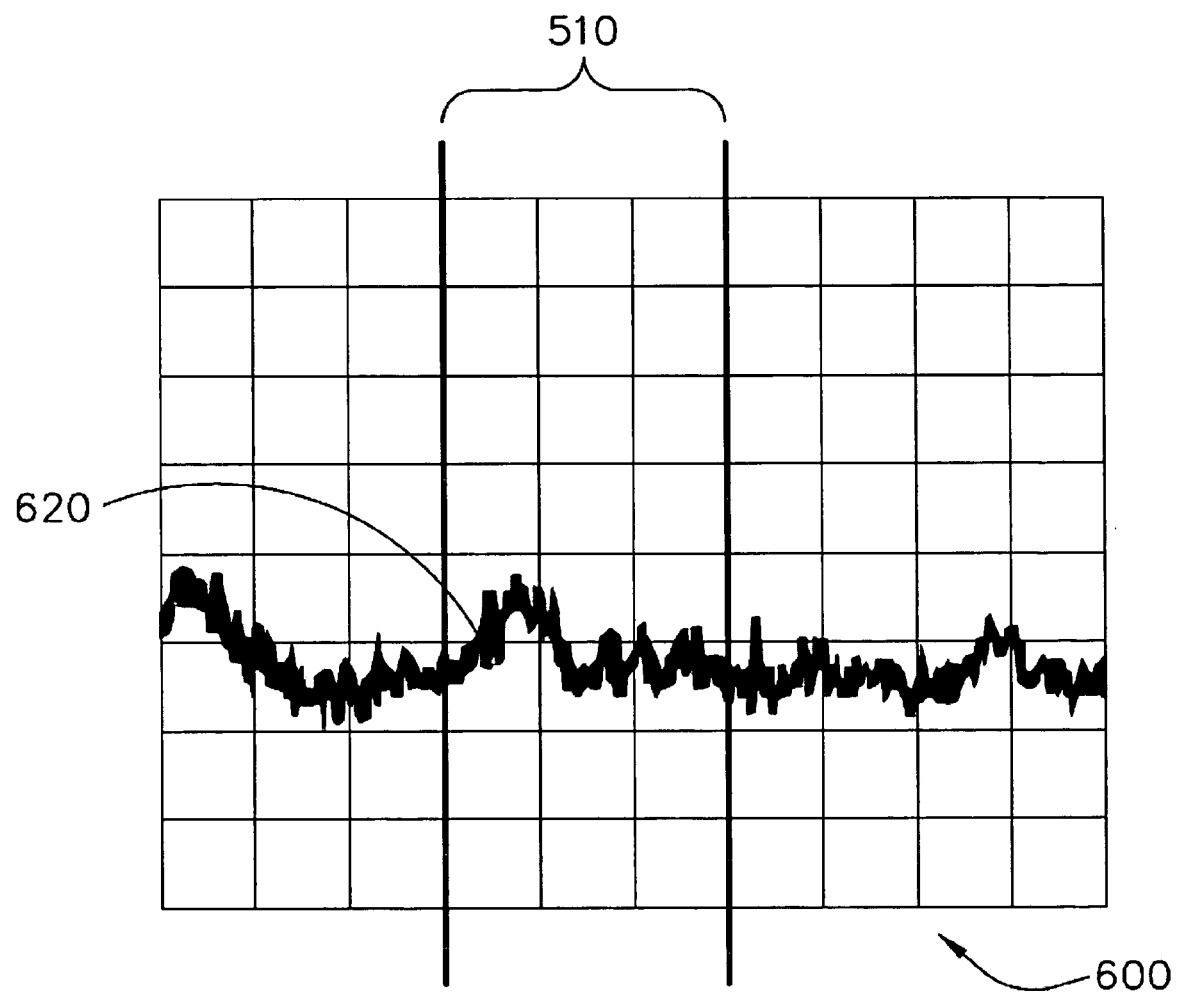
FIG. 6 illustrates a plot of the spectral energy in an interference signal following application of interference compensation according to an exemplary embodiment of the present invention.

Turning now to FIGS. 5 and 6, these figures respectively show spectral plots 500, and 600 before and after applying interference compensation according to an exemplary embodiment of the present invention. More specifically, the traces 520, and 620 of these plots 500, and 600 illustrate data obtained in laboratory testing of an interference compensation system in accordance with an exemplary embodiment of the present invention.

The spectra 520, and 620 characterize a 450 megabits-per-second ("Mbps") (PRBS-31) interfering signal coupled onto a 2.1 GHz antenna that is in close proximity to a flex cable carrying the 450 Mbps signal. In the frequency band of interest 510, the compensation achieved approximately 12 dB of interference suppression.

Referring now to FIGS. 1, 2, and 3 together, the interference compensation circuit 130 can function or operate in at least two modes. In one mode, the circuit 130 can consume less power than in the other mode. That is, the interference compensation circuit 130 can transition from an active mode of relatively high power usage to another mode of relatively low power usage. The lower power mode can be a standby mode, a power-saving mode, a passive mode, an idle mode, a sleep mode, or an off mode, to name a few possibilities. In the lower power mode, the interference compensation circuit can draw a reduced level of power, minimal power, essentially no power, or no power at all. Part or all of the interference compensation circuit illustrated in FIG. 3 and discussed above can be disconnected from power in the low power mode. An occurrence of one criterion or multiple criteria or conditions can trigger a transition from active compensation to a standby mode. Thus, the transition can occur automatically in response to an event other than a user turning off an appliance, such as a cell phone, that comprises the circuit 130.

In a handset application, operating the interference compensation circuit 130 in a power-saving mode can extend the operation time of a single battery charge, thereby enhancing the commercial attractiveness of the handset. Power reduction can be implemented or achieved without degrading interference compensation performance.

Conditions occur in wireless handset devices that provide an opportunity for reduced power consumption. In particular, many of the EMI sources are not always active and, therefore, are not always emitting interference. For situations in which the interference compensating circuit 130 and its associated controller 335 do not need to apply a compensation signal, the circuit 130 can transition to a sleep or stand-by mode of reduced power consumption. That is, rather than having one or more circuit elements receiving power while not producing an output or actively manipulating signals, power can be removed from those elements or from a selected set of circuit elements.

Thus, in one exemplary embodiment of the present patent invention, the system 100 experiences states in which operating certain components of the interference compensation circuit 130 is unnecessary. In such states, the controller 335 can place those components in a low-power or standby mode or can remove power entirely from those components. For example, when an EMI source is not active for a threshold amount of time, the interference compensation circuit 130 can transition to the standby mode. More specifically, when the bus 110 is not actively carrying data traffic, the interference compensation circuit 130 can switch to the standby mode to conserve battery power.

In one exemplary embodiment, the sensor 115 provides a signal that is indicative of whether the bus 110 is active. That is, the level, voltage, amplitude, or intensity of the signal that the sensor 115 output can provide an indication of whether the bus is actively transmitting aggressor signals.

When appropriate conditions are met, electrical power can be removed from the components 305, 310, 315, 320 that generate the emulated EMI signal. And, power can additionally or optionally be removed from some or all of the circuitry of the control module 335. However, components used to store the emulation characteristics or parameters, i.e. the emulation channel settings that match the coupling channel, can be kept active so as to immediately or quickly restore the interference compensation circuit's emulation channel to its last known state when the EMI source (e.g. the aggressor channel 110) is reactivated. In other words, the memory system of the controller 335 can retain power access to avoid loss of the parametric values stored in memory. Keeping the parametric values in memory facilitates rapid restoration to active cancellation upon reactivation of the EMI source. Thus, recalling the operational settings of the phase adjuster 305, the emulation filter 315, the delay adjuster 320, and the VGA 310 avoids the interference that would occur if the emulation was retrained from an arbitrary reset state following transition from standby mode to active mode.

Operating in the standby mode can comprise either full powering down one or more circuit components and/or operating in a state of reduced power usage. In some instances, the latter may be preferred in order to rapidly bring the component out of the standby state when the EMI source is reactivated.

In one exemplary embodiment of the present invention, a standby signal instructs or triggers the interference compensation circuit 130 to transition to its power-saving or standby state. The standby signal can also trigger the transition from the power-saving or standby state to an active state. A device transmitting the source of the EMI, or an associated power detector, can generate a signal indicating that it is actively transmitting data. For example, the DSP chip 135 that sends data to the display 140 in the mobile phone system 100 can output an binary signal or code to indicate that it not transmitting data and consequently emitting EMI.

As another example, the camera imaging sensor 145 that sends data to a the DSP chip 135 can output a binary signal or a digital code to indicate whether or not it is transmitting data that could produce EMI. As yet another example, a radio device that uses time-division multiplexing can provide the triggering standby signal. Such a radio device can be used in GSM or wideband code division multiple access (W-CDMA) applications, for example. In this situation, the radio may output a binary signal to mark the time divisions or intervals in which it is transmitting data. During those portions of the duplexing stage, the interference compensation should be active, as the transmitted signal can aggress a second radio device on a wireless handset.

In one exemplary embodiment of the present invention a power detector, such as the detector 330 but attached to the output of the sampler 115, examines the sampled EMI signal and generates the standby signal based on properties of the sampled EMI signal. For example, a standby state can be set if the detector 330 determines that power of the sampled EMI signal is below a given or predetermined threshold. Conversely, the interference compensation circuit 130 can be activated when the detected power moves above the threshold.

In one exemplary embodiment of the present invention, the standby state can be declared if the time-localized peak amplitude of the sampled EMI signal falls below a given threshold. One advantage of this embodiment is that its implementation does not typically require an extra pin on the device package to be fed a dedicated standby signal. Instead, the standby signal could be derived from an available pin already used for EMI cancellation.

In one exemplary embodiment, a transition between standby and active mode can occur in response to a change in the strength of a reception signal. For example, a circuit can become active when the number of reception "bars" on a cellular telephone reach a threshold level. In one exemplary embodiment, a transition can occur in response to a change in a data rate or a bit rate, for example.

In one exemplary embodiment of the present invention, all the components 305, 310, 315, 320 of the emulation channel that are used to generate the emulated EMI signal from the sensor's sampled EMI source signal can be placed in the low-power standby state. In one exemplary embodiment of the present invention, one or more of the following components are placed in standby mode in response to an occurrence of a standby condition: the phase adjuster 305, the BP channel emulation filter 315, the delay adjuster 320, and the VGA 310. Reducing power consumption of those devices components 305, 310, 315, 320 facilitates significant power savings when the EMI source is inactive.

The controller 335, which can also be referred to as a control module, can be inactive when the EMI source is inactive. With no source of EMI and an inactive controller 335, interference is not typically problematic. More specifically, no EMI occurs, and the emulation path is producing a zero emulation signal. In many circumstances, an improvement in interference performance can result from deactivating the emulation path when no source of EMI is active. If the emulation channel remains active when no EMI source is active, the emulation channel parameters may drift towards a set of values that poorly match the underlying EMI coupling channel. In this situation, activating the EMI source can result in poor tuning that causes the interference compensation circuit 130 to learn new, more effective parameters. In other words, when the interference compensation circuit 130 is inactive, an improperly tuned coupling channel can still produce a zero emulation signal since the sampled EMI source signal will be zero.

In one embodiment of the present invention, all of the components, or essentially all of the active components, of the control module can be placed in the standby state when the standby signal is asserted, thereby providing a high level of power savings.

In one exemplary alternative embodiment of the present invention, the register or memory elements used to store the controllable parameters in the emulation channel are fully powered, while the rest of the control module 335 is deactivated. This embodiment facilitates rapidly or immediately returning the emulation channel to its pre-standby state when the system exits the standby mode. In other words, once the system leaves standby mode, the interference compensation circuit 130 can resume cancellation from a previously-known and accurate channel model, rather than starting the cancellation from an arbitrary reset state. Resuming operation of the interference compensation circuit 130 from an arbitrary set of parameters may take an undesirably long period of time prior to convergence to an accurate channel model. During this learning time, EMI cancellation performance may be insufficient or inadequate.

Figure 7:
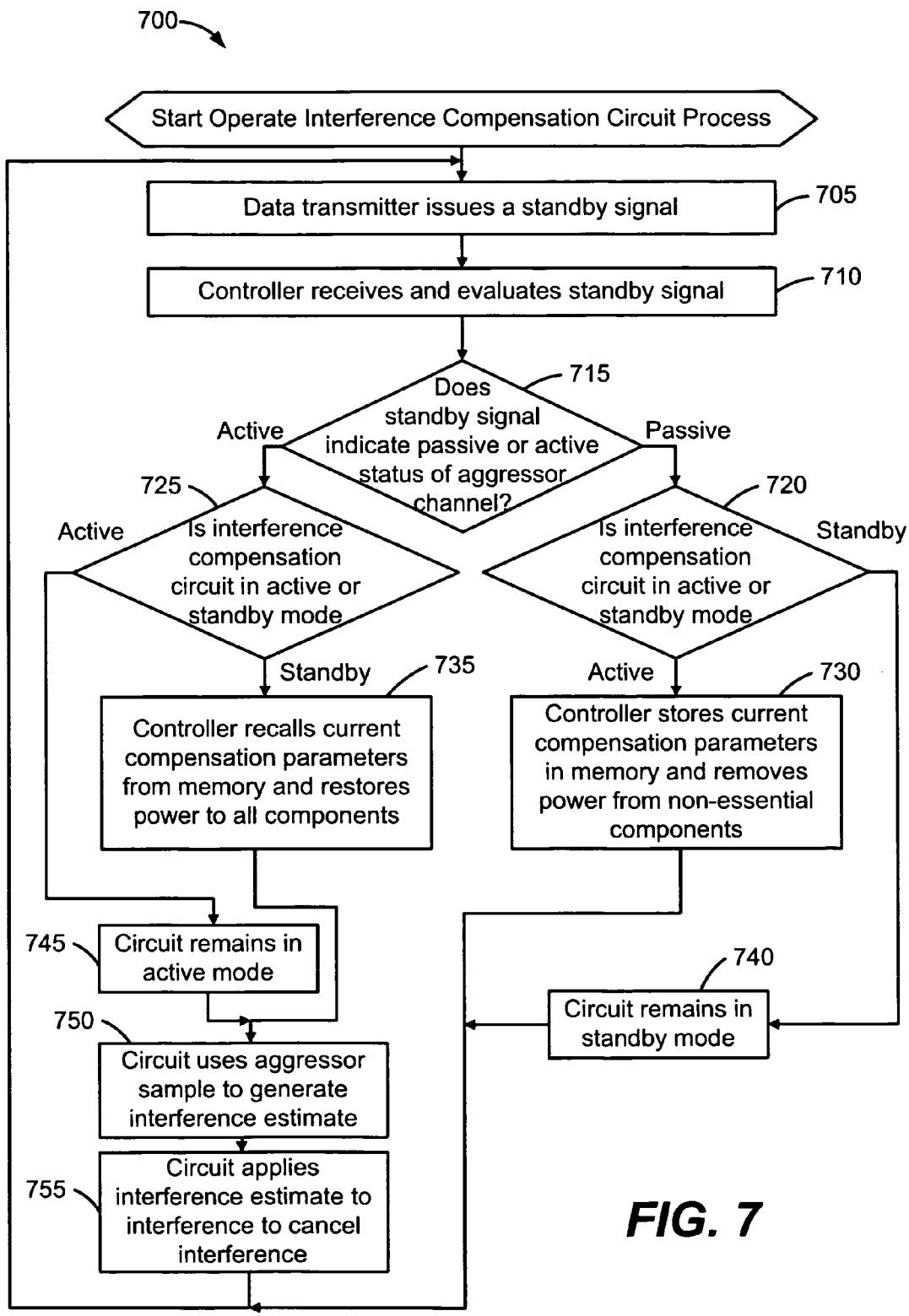
FIG. 7 illustrates a flowchart of a process for operating an interference compensation circuit in a plurality of modes according to an exemplary embodiment of the present invention.

Turning now to FIG. 7, this figure illustrates a flowchart of a process 700 for operating an interference compensation circuit 130 in a plurality of modes in accordance with an exemplary embodiment of the present invention. The Process 700, which is entitled Operate Interference Compensation Circuit, can be viewed as a process for managing power consumption of an interference compensation circuit 130.

At Step 705, a data transmitter, such as the camera 145 or the DSP chip 135 issues a standby signal that can comprise a digital code. The code carries the status of the transmitter, for example whether the transmitter is actively transmitting data or is in a passive state between two time periods of data transmission. In one embodiment, the code specifies whether the transmitter is preparing to actively transmit data or to change between operational states.

At Step 710, the controller 335 receives the standby signal and determines whether the transmitter is in an active state of transmitting data or a passive state. Decision Step 715 branches the flow of Process 700 to Step 725 if the standby signal indicates that the transmitter is active. If, on the other hand, the standby signal indicates that the transmitter is passive, then decision Step 720 follows Step 715.

At decision Step 720, the controller 335 determines whether the interference compensation circuit 130 is in an active mode or is otherwise in a passive mode. If the interference compensation circuit 130 is in an active mode, then Step 730 follows Step 720.

At Step 730, the controller 335 stores the current or present compensation parameters in memory and removes power from the emulation channel components 305, 310, 315, 320. This action places the interference compensation circuit 130 in a standby or power-saving mode. The stored compensation parameters typically comprise the settings of each of the adjustable components 305, 310, 315, 320 of the emulation channel.

If at decision Step 720, the controller 335 determines that the interference compensation circuit 130 is in the standby mode rather than the active mode, then Step 740 follows Step 720. At Step 740, the interference compensation circuit 130 remains in the standby mode.

If decision step 715 branches the flow of Process 700 to Step 725 rather than Step 720 (based on the standby signal indicating active data transmission), then at decision Step 725, the controller 335 determines whether the interference compensation circuit 130 is in active mode or standby mode.

If the interference compensation circuit 130 is in active mode, then Step 745 follows Step 725. At Step 745, the interference compensation circuit 130 remains in active mode.

If the controller 335 determines at decision Step 725 that the interference compensation circuit 130 is in standby mode rather than active mode, then Step 735 follows Step 725. At Step 735, the controller 335 recalls the current or last-used compensation parameters from memory and restores power to the powered-down components. Restoring power typically comprises initializing each of the adjustable components 305, 310, 315, 320 of the emulation channel with the parametric settings recalled from memory.

Step 750 follows execution of either of Steps 735 or 745. At Step 750, the interference compensation circuit 130 generates an estimate of the interference based on processing the aggressor sample, which the sensor 115 obtained. As discussed above with reference to FIG. 3, the emulation channel components 305, 310, 315, 320 process the sample to output the interference estimate.

At Step 755, the interference compensation circuit 130 applies the interference estimate to the victim channel to cancel, suppress, or correct the interference occurring thereon.

Following execution of any of Steps 730, 740, and 755, Process 700 loops back to and executes Step 705 as discussed above. Execution of Process 700 continues following the loop iteration.

Figure 8:
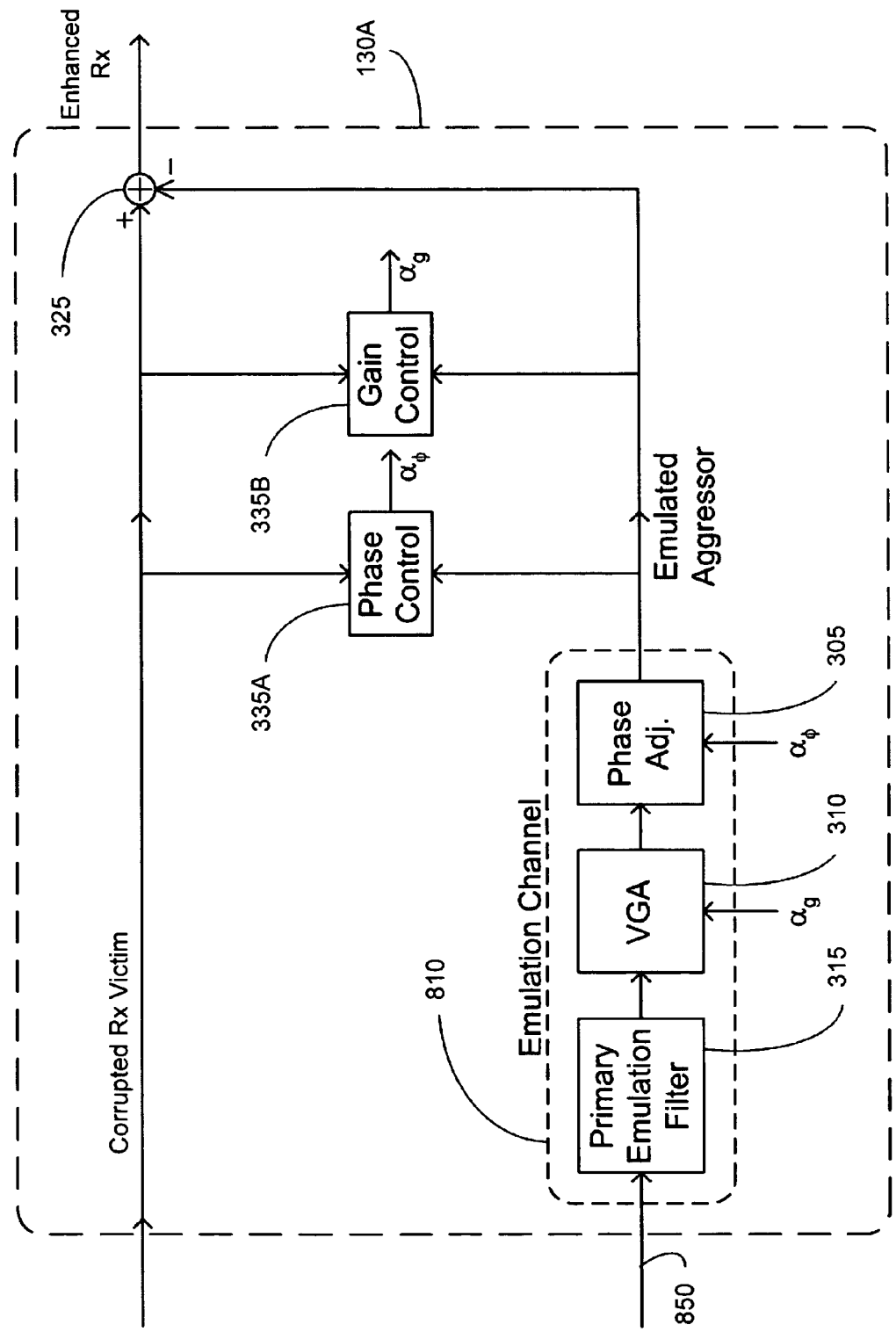
FIG. 8 illustrates a functional block diagram of an EMI compensation control circuit according to an exemplary embodiment of the present invention.

Referring now to FIG. 8, this figure illustrates a functional block diagram of an EMI compensation circuit 130A according to one exemplary embodiment of the present invention. The illustrated circuit 130A can be an exemplary embodiment of the system 130 discussed above.

As illustrated, a tap of the aggressor signal 850 is provided to the emulation channel 810 which acts upon the aggressor signal to mimic the aggressor signal that was coupled onto the victim signal. In coupling to the victim signal, the aggressor signal may have suffered one or more of phase shift, amplitude loss, and frequency selective coupling, for example. The stages 315, 310, 305 within the emulation channel 810 represent these coupling effects. Thus, the stages 315, 310, 305 process the signal from the aggressor tap 850 to create a signal that matches the aggressor signal, as coupled into the victim signal.

To generate the emulated interference signal, the emulation channel 810 comprises mechanisms such as the primary emulation filter 315, a VGA 310, and a variable phase adjuster 305. In the illustrated embodiment, the primary emulation filter 315 is a fixed filter that serves as a coarse-scale model of the coupling channel. The channel modeling is then refined by the variable gain 310 and phase adjust 305 stages to fine-tune the match to the actual coupling channel. The emulated coupling signal generated by the emulation channel 810 may then be subtracted from the corrupted victim signal at the summation node 325. When the parameters of the emulation channel 810 have appropriate settings, the generated emulated aggressor signal should substantially equal the actual aggressor signal, which is incurred by the received victim. Thus, after the summation node 325, the aggressor should be substantially removed from the victim signal.

The phase control stage 335A determines the amount of phase adjustment in the phase adjuster 305 by generating an analog control signal $\alpha_\phi$ (alpha, sub phi). This control signal is fed into the phase adjuster 305 and directly determines the amount of phase adjustment applied in the emulation channel.

Similarly, the gain control stage 335B sets the amount of gain adjustment in the VGA 310 by generating an analog control signal $\alpha_g$ (alpha, sub g). This control signal is fed into the VGA 310 and directly specifies the amount of gain adjustment applied in the emulation channel.

Figure 9:
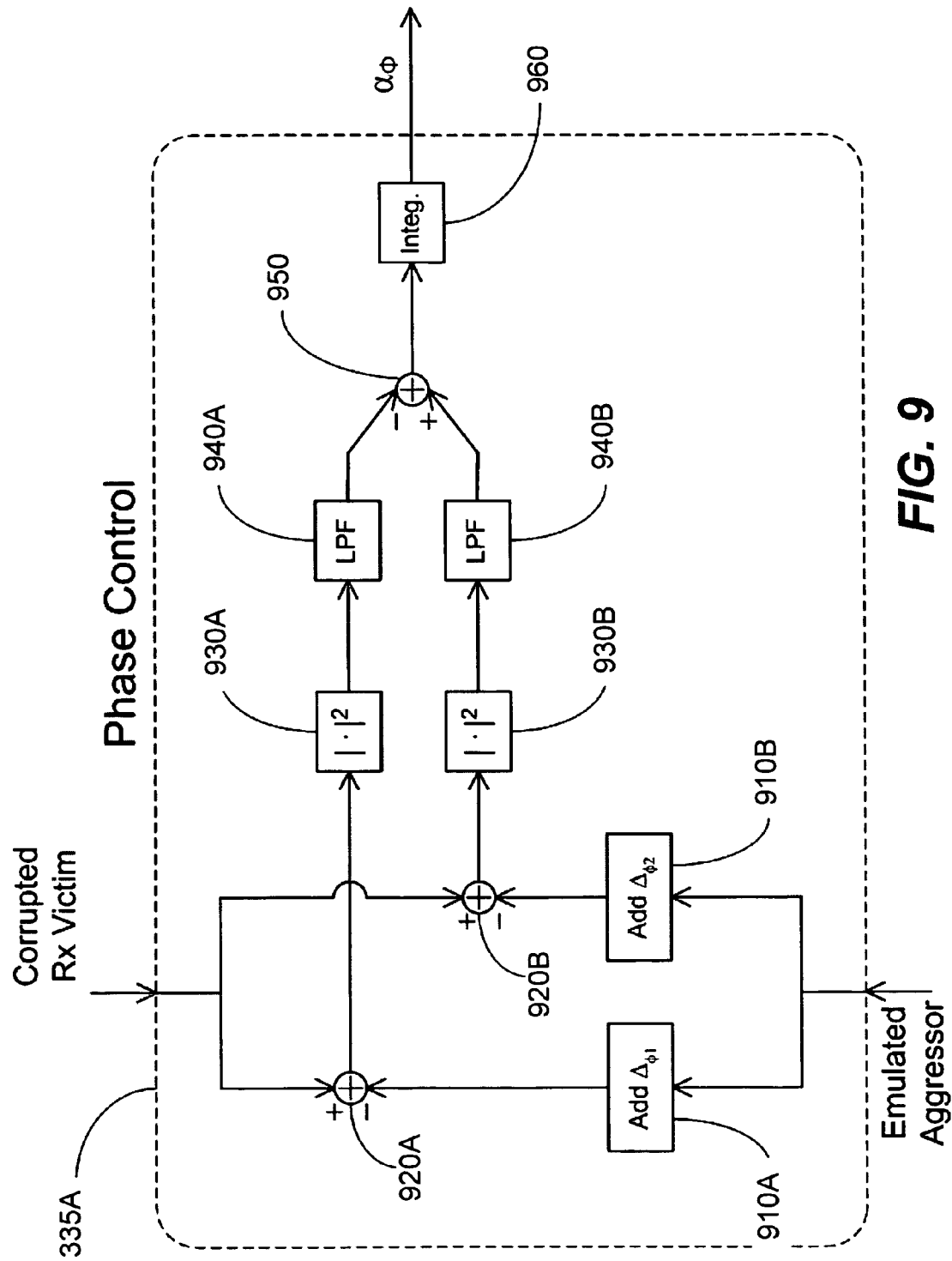
FIG. 9 illustrates a functional block diagram of a phase control stage of an interference compensation circuit according to an exemplary embodiment of the present invention.

Referring now to FIG. 9, this figure illustrates a functional block diagram of an exemplary embodiment of the phase control stage 335A shown in FIG. 8, discussed above. Here, the phase control stage 335A receives the emulated aggressor signal from the emulation channel 810 and samples corrupted victim signal. With the phase adjuster 305 using a current value of $\phi_0$ (phi, sub zero) for the phase, the phase control stage 335A processes those received signals to produce a new value $\alpha_\phi$ (alpha, sub phi) for the phase adjuster 305.

The emulated aggressor signal is split into a pair of emulated aggressor signals to which an additional phase adjustment or a temporal delay is applied. A phase of $\Delta_{\phi 1}$ (delta sub phi one) is added to the first signal of the split pair via the phase shifter (or delay) 910A, thereby yielding an output signal that represents the emulation signal with total phase adjustment of $\phi_0+\Delta_{\phi 1}$. Likewise a phase of $\Delta_{\phi 2}$ (delta sub phi two) is added to the second of the split pair via phase shifter 910B to yield an output signal that represents the emulation signal with a total phase adjustment of $\phi_0+\Delta_{\phi 2}$.

Like the input emulation signal, the corrupted victim signal is also split into a first and second corrupted victim signal. Summation node 920A subtracts the output of the first phase shifter 910A from the first of the split pair of the corrupted victim signal to yield the aggressor-cancelled victim signal using a phase adjustment of $\phi_0+\Delta_{\phi 1}$. Summation node 920b subtracts the output of the second phase shifter 910b from the second of the split pair of the corrupted victim signal to yield the aggressor-cancelled victim signal using a phase adjustment of $\phi_0+\Delta_{\phi 2}$.

The energy of each of the aggressor-cancelled victim signals is then obtained by application of a power-detecting device 930A, 930B followed by a low-pass filter (LPF) 940A, 940B to each of the signals.

The outputs of the LPFs 940A and 940B represent the energy of the aggressor-cancelled victim signals with extra phase adjustments of $\Delta_{\phi 1}$ and $\Delta_{\phi 2}$ (beyond the phase of $\phi_0$ applied in the emulation channel), respectively. As will be appreciated by one skilled in the art having benefit of this disclosure, for each of the aggressor-cancelled victim signals, the energy of the aggressor-cancelled victim signal may equal the sum of (i) the energy of the victim signal alone plus (ii) the energy of the cancelled aggressor component. This decomposition holds because the aggressor and victim signal are statistically independent signals. This energy-decomposition property is relevant because the subtraction device 950, subtracts the pair of energy signals for the aggressor-cancelled victim signals.

Because both aggressor-cancelled victim signals share the same victim component, the energy contributions of the victim signal can nullify each other at the output of the subtraction node 950. In other words, it is equivalent to the victim signal being zero or not present. Thus, the output of the subtraction node 950 is the difference of the energies of the cancelled aggressor with an extra phase of $\Delta_{\phi 1}$ and the cancelled aggressor with an extra phase of $\Delta_{\phi 2}$. In other words, the output of the subtraction node 950 is equivalent to the mathematical derivative of the residual aggressor energy with respect to phase. In particular, it approximates the negative derivative around the phase value $\phi_0+(\Delta_{\phi 1}+\Delta_{\phi 2})/2$.

By running the output of the subtraction node 950 through an integrating device 960, and using the integrated output as the value of $\alpha_\phi$ to directly control the value of $\phi_0$ in the phase adjuster 305, the system can converge to a state that results in the subtraction node 950 output being zero, or nearly zero. This state can correspond to the energy of the residual aggressor being minimized with respect to phase adjustment, and thus an optimum control value is achieved.

Figure 10:
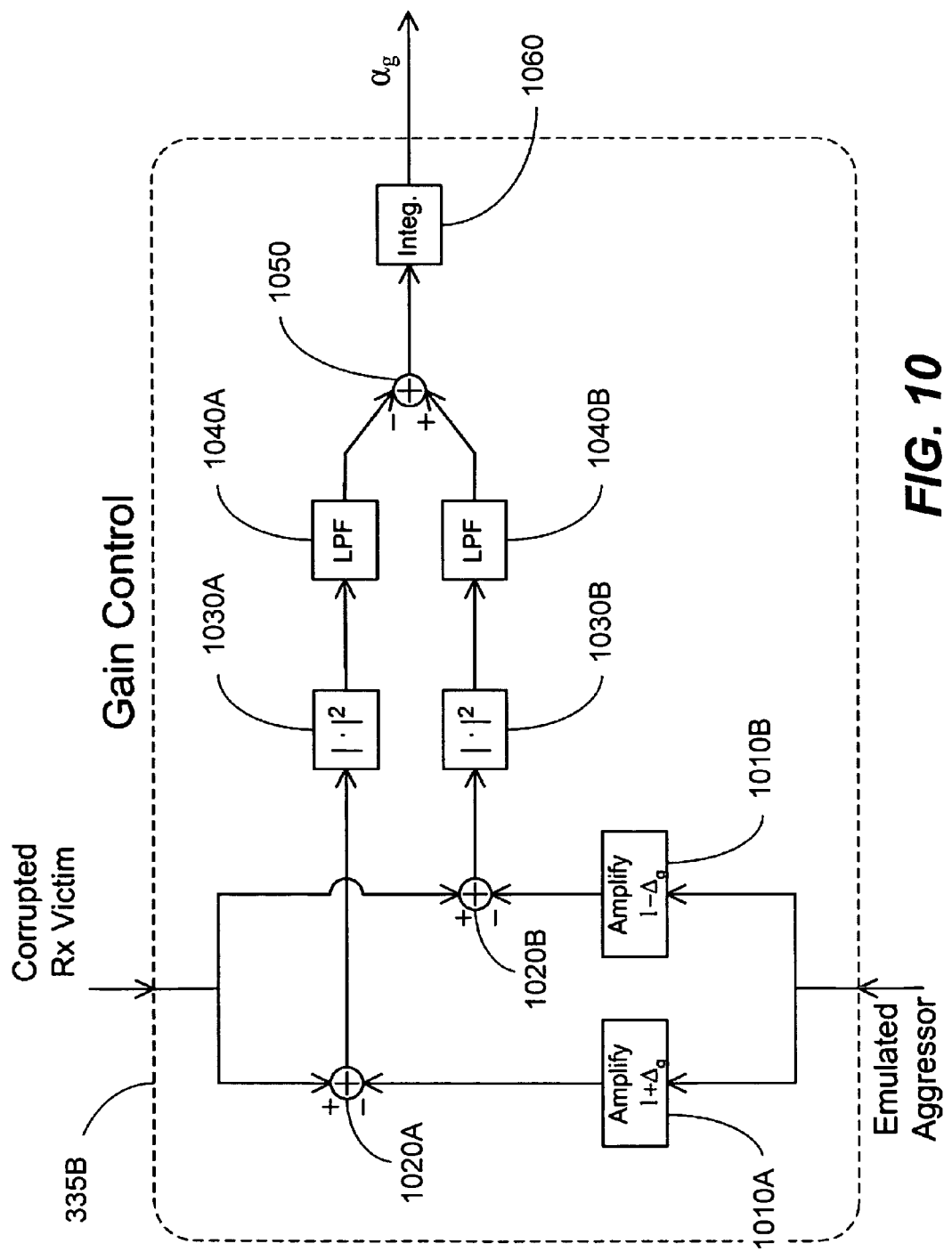
FIG. 10 illustrates a functional block diagram of a gain control stage of an interference compensation circuit according to an exemplary embodiment of the present invention.

Referring now to FIG. 10, this figure illustrates a functional block diagram of an exemplary embodiment of the gain control stage 335B illustrated in FIG. 8, discussed above. The operation of this control stage is somewhat similar to that of the phase control stage 335A. The gain control stage 335B takes as inputs the emulated aggressor signal from the emulation channel 810 and the corrupted victim signal. The gain applied by the VGA 310 in the emulation channel 810 will be denoted as $A_0$ (A sub zero).

The emulated aggressor signal is split into a pair of emulated aggressor signals to which an additional gain or attenuation is applied. An additional gain of $1+\Delta_g$ is applied to the first signal of the split pair via the amplifier 1010A to yield an output signal that represents the emulation signal with total gain of $A_0+A_0\Delta_g$. Similarly, a gain of $1-\Delta_g$ is applied to the second of the split pair via amplifier 1010B to yield an output signal that represents the emulation signal with a total gain of $A_0-A_0\Delta_g$. The effect of amplifier 1010B may also be interpreted as attenuation since the gain factor $1-\Delta_g$ is typically less than one.

Like the input emulation signal, the corrupted victim signal is also split into a first and second corrupted victim signal. Summation node 1020A subtracts the output of the first amplifier 1010A from the first of the split pair of the corrupted victim signal to yield the aggressor-cancelled victim signal using a gain of $A_0+A_0\Delta_g$. Summation node 1020B subtracts the output of the second amplifier 1010B from the second of the split pair of the corrupted victim signal to yield the aggressor-cancelled victim signal using a gain of $A_0-A_0\Delta_g$.

The energy of each of the aggressor-cancelled victim signals is then obtained by application of a power-detecting device 1030A, 1030B followed by a low-pass filter (LPF) 1040A, 1040B to each of the signals. The outputs of the LPFs 1040A and 1040B represent the energy of the aggressor-cancelled victim signals with extra gains of $1+\Delta_g$ and $1-\Delta_g$ (beyond the gain of $A_0$ applied in the emulation channel), respectively. The subtraction device 1050, subtracts the pair of energy signals for the aggressor-cancelled victim signals. The output of the subtraction node 1050 is the difference of the energies of the cancelled aggressor with an extra gain of $1+\Delta_g$ and the cancelled aggressor with an extra gain of $1-\Delta_g$. In other words, output of the subtraction node 1050 is equivalent to the mathematical derivative of the residual aggressor energy with respect to gain. In particular, it approximates the negative derivative around the gain value $A_0$.

By running the output of the subtraction node 1050 through an integrating device 1060 and using the integrated output as the value of $\alpha_g$ to directly control the value of $A_0$ in the VGA 310, the system can converge to a state which results in the subtraction node 1050 output being zero or nearly zero. This state corresponds to the energy of the residual aggressor being substantially minimized with respect to gain adjustment. Thus, a substantially optimum control value may be achieved.

Figure 11:
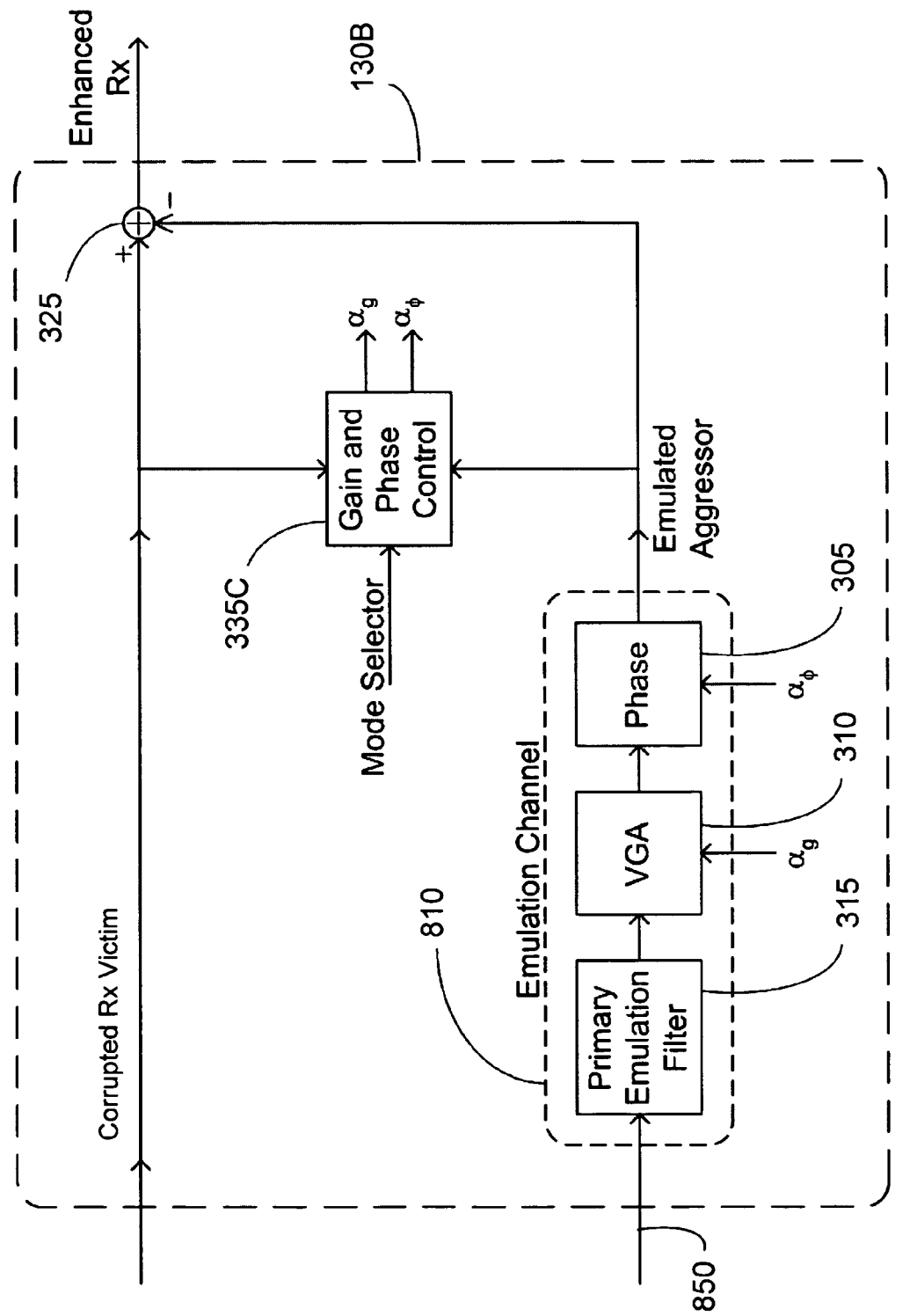
FIG. 11 illustrates a functional block diagram of an EMI compensation control circuit with combined gain and phase control according to an exemplary embodiment of the present invention.

Referring now to FIG. 11, this figure illustrates a functional block diagram of phase and gain control modules combined into a single control module 335C for an EMI cancellation device 130B according to one exemplary embodiment of the present invention. The system 130B can be an exemplary embodiment of the system 130 of FIG. 3, discussed above.

As illustrated in FIGS. 9 and 10, discussed above, the phase control module 335A and gain control module 335B of those figures comprise certain duplicate circuit components. However in the system 130B, the otherwise redundant components provide both gain-control and phase-control functionality, thereby creating a more compact or efficient circuit.

Benefits from reducing circuit redundancy can include lower power consumption, reduced parasitic effects, and smaller circuit size. That is, a beneficial circuit can be realized by integrating the phase and gain control modules into a single control module 335C within the EMI cancellation device 130B. The combined module 335C takes a third input (beyond the corrupted received victim signal and emulated aggressor signal) to select the operational mode. In other words, the module 335 can be characterized as a controller that has two modes of operation, one for gain control and one for phase control.

Figure 12:
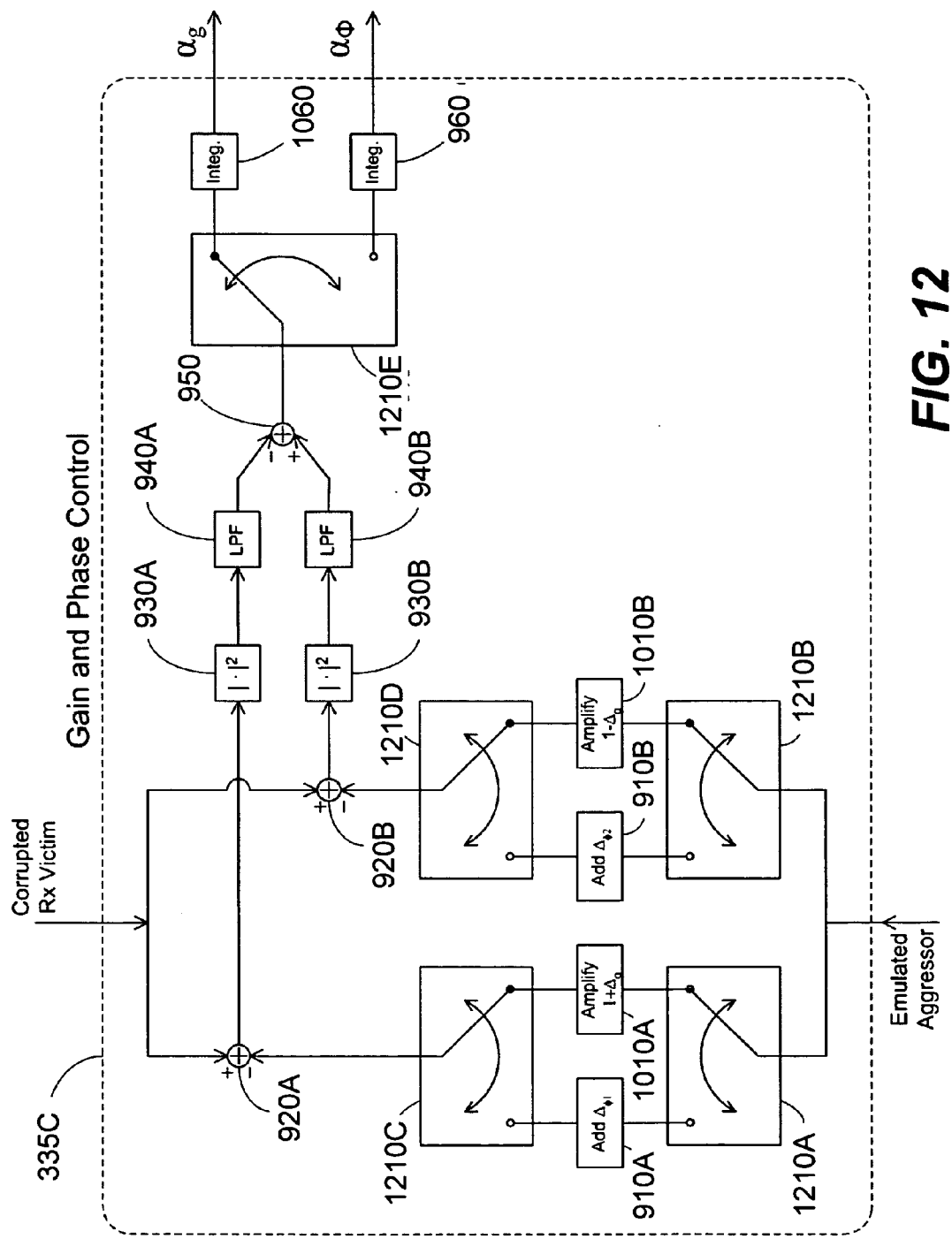
FIG. 12 illustrates a functional block diagram of a combined gain and phase control stage according to an exemplary embodiment of the present invention.

A mode-selector signal serves as a switch, controlling whether the module 335C should adjust the gain or the phase of the emulation channel 810 at any given time. The control module 335C outputs both the gain control signal $\alpha_g$ and the phase control signal $\alpha_\phi$. In one mode, the control module 335C makes gain adjustments while holding phase constant. In the other mode, the control module 335C makes phase adjustments while holding gain constant. In an alternative embodiment, gain and phase may be concurrently adjusted. FIG. 12, discussed below, illustrates an exemplary embodiment of the combined control module 335C.

Referring now to FIG. 12, the figure illustrates a functional block diagram for the combined gain and phase control module 335C. The combined gain and phase control module 335C has certain functional similarities to that of the phase control module 335A and gain control module 335B. One distinction is the five switches 1210A-1210E of the gain control module 335B that control whether gain or phase is being adjusted.

When the mode selection input to the control module 335C specifies gain adjustment, the five switches 1210A-1210E are set as shown in FIG. 12. Specifically, switches 1210A and 1210C are set so that a first adjustment path adds gain beyond the nominal emulation channel 810 via amplifier 1010A. Meanwhile, switches 1210B and 1210D are set so that a second adjustment path reduces gain after the nominal emulation channel 810 via amplifier 1010B. And, switch 1210E is set so that the derivative output is fed to the integrator 1060 for gain control. Under these settings, the control module 335C operates in the same fashion as the gain control module 335B described earlier.

When the mode selection input to the control module 335C specifies phase adjustment, the five switches 1210A-1210E all change to the opposite state of that shown in FIG. 12. Specifically, switches 1210A and 1210C are set so that the first adjustment path adds a first phase or equivalently a delay offset beyond the nominal emulation channel 810 via phase shifter 910A. Further, switches 1210B and 1210D are set so that a second adjustment path adds a second phase offset beyond the nominal emulation channel 810 via phase shifter 910B. And, switch 1210E is set so that the derivative output is fed to the integrator 960 for phase control. Under these settings, the control module 335C operates in the same fashion as the phase control module 335A described earlier.

The mode selection input signal to the control module 335C can be obtained in a variety of ways. For example, a clock signal can be used as the model selection signal to periodically alternate between gain and phase adjustment according to a fixed interval. Another option is to use the derivative signal output from the summing node 950. For example, when the derivative value falls below a preset threshold, indicating that the current adjustment mode has reached a nearly optimum value, the mode selection signal can be toggled to change the mode of operation. This can be done on a continuing basis to constantly maintain substantially optimized gain and phase adjustments.

Thus, the control module 335C can switch between operational modes in response to an occurrence of a time event, a signal event, or a condition or conditional event. Moreover, the switch can occur automatically or based on a rule of operation, a signal change, feedback, a signal analysis result, a signal exceeding or meeting a predefined threshold, or an operational state. To name a few more examples, a mode change can occur on a recurring time basis or at a designated time or time interval.

In one exemplary embodiment, a transition between control modes can occur in response to a change in the strength of a reception signal. For example, a mode change can automatically occur when the number of reception "bars" on a cellular telephone reach a threshold level. In one exemplary embodiment, a transition can occur in response to a change in a data rate or a bit rate, for example.

Figure 13:
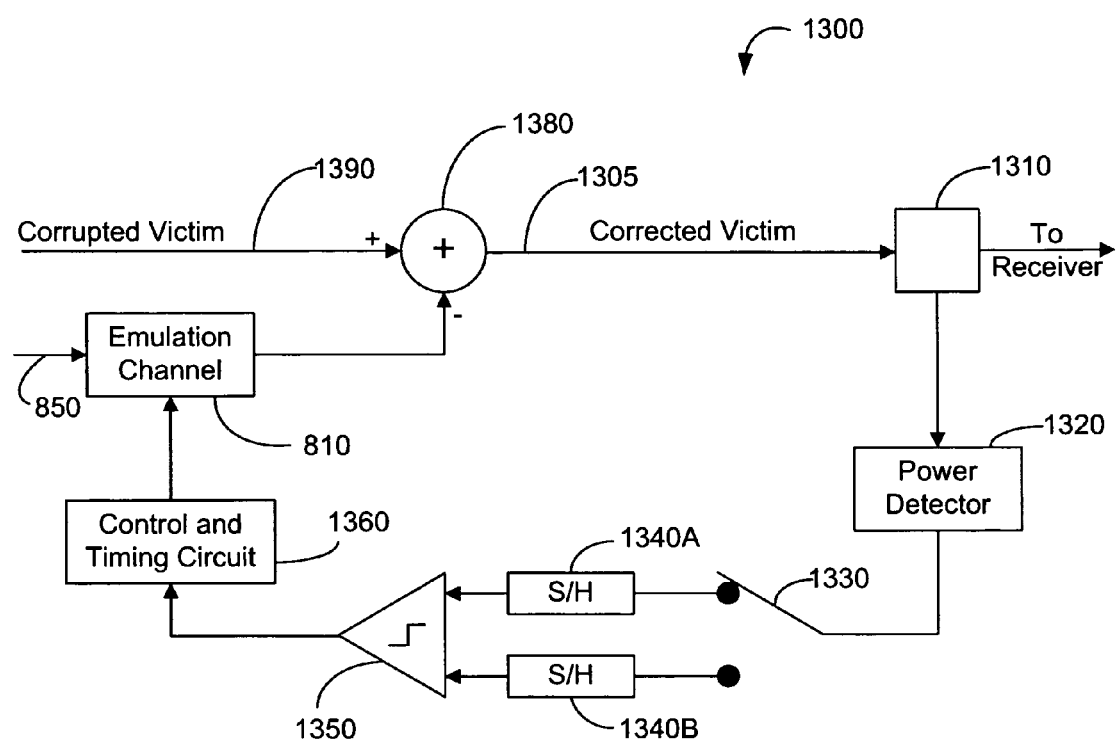
FIG. 13 illustrates an interference compensation control circuit according to an exemplary embodiment of the present invention.

Referring now to FIG. 13, this figure illustrates an interference compensation circuit 1300 that can be coupled to an interference sensor 115, 125 according to an exemplary embodiment of the present invention. In other words, in one exemplary embodiment, the system 100 illustrated in FIG. 1 and discussed above can comprise the circuit 1300 rather that the circuit 130. This embodiment is composed of a high-impedance tap 1310 of the corrected victim signal 1305 after noise cancellation summer 1380.

The circuit 1300 comprises a power detector 1320 that can be an RMS detector or a peak power detector, for example. The power detector 1320 is followed by a switch 1330 that selects one of at least two sample-and-hold circuits 1340A, 1340B. The sample-and-hold circuits 1340A, 1340B feed a comparator or multiple comparators 1350. The outputs of the comparator 1350 goes to the control and timing circuit 1360. The control and timing circuit 1360 provides timing to the switch 1330, sample-and-hold circuits 1340, comparator(s) 1350, and other control circuits as needed. The control and timing circuit 1360 also controls the emulation channel 810 of the active wireless canceller. The emulation channel 810 acts upon a tap or sample of the aggressor signal 850 to attempt to mimic the aggressor signal that was coupled onto the victim signal as discussed above.

The interference compensation circuit 1300 can operate in two or more modes, one of which offers reduced power consumption relative to the other. In other words, in one exemplary embodiment of the present invention, the circuit 1300 transitions to a power-saving mode upon occurrence of a trigger event. In that mode, power can be removed from one or more of the power detector 1320, the switching device 1330, the sample and hold circuits 1340A and 1340B, and the comparator 1350. The power detector 1320 and comparator 1350 are two leading contributors to power consumption, thus disconnecting their power supply can achieve significant power savings. The control and timing circuit 1360 typically comprises low-speed digital logic that consumes negligible power. Nonetheless, most of this circuit 1360 can be deactivated with the exception of the registers, which store the values of the emulation channel 810 parameters.

Figure 14:
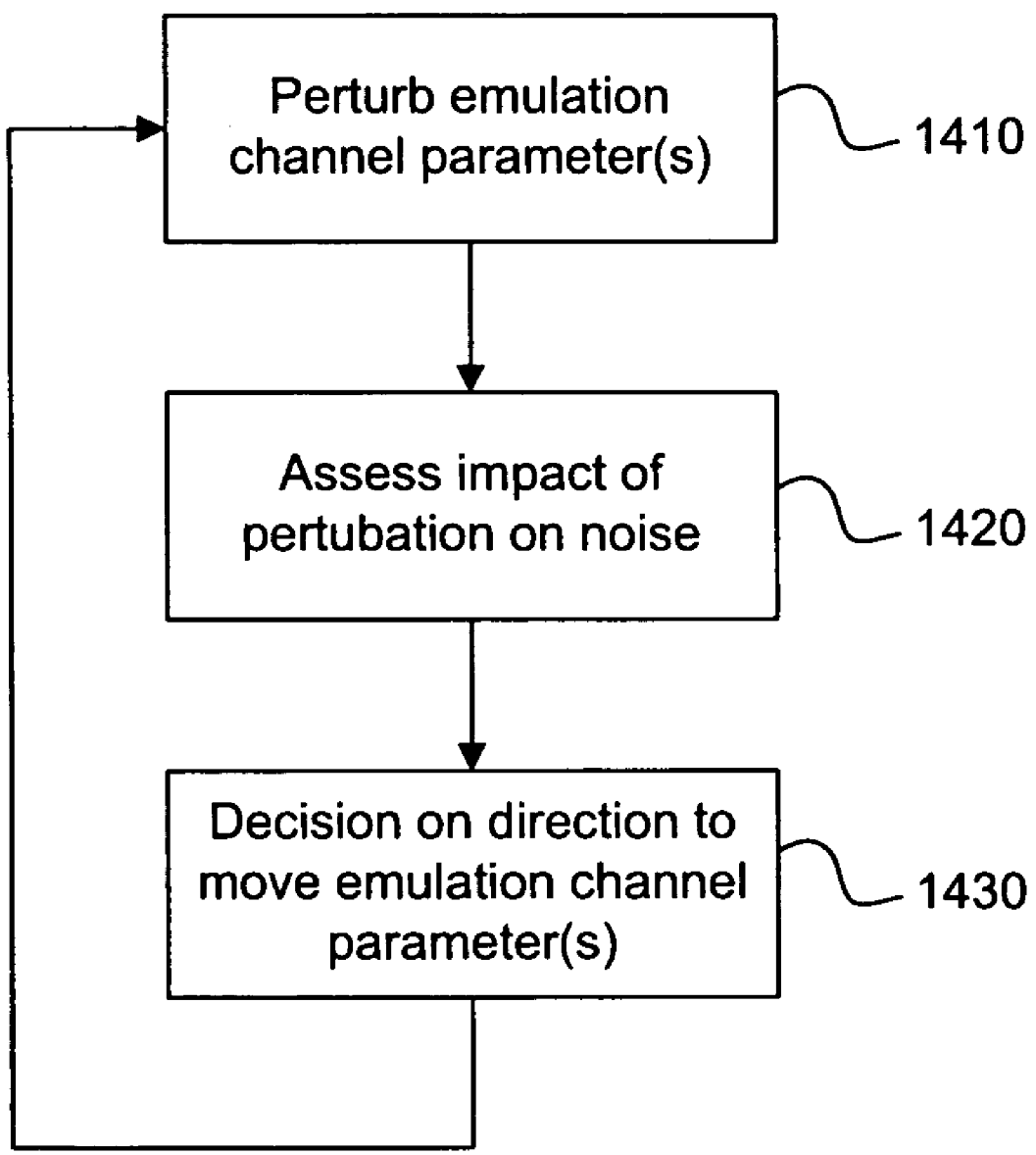
FIG. 14 illustrates a flow diagram of a process for optimizing emulation channel parameters according to one exemplary embodiment of the present invention.

Referring now to FIG. 14, the Figure illustrates a logical flow diagram of a process for optimizing emulation channel parameters according to one exemplary embodiment of the present invention. The control and timing circuit performs a gradient optimization of the emulation channel parameters and coordinates the timing of all the control loop circuits. In Step 1410, emulation filter parameters, such as gain and phase, are perturbed by a small amount individually or simultaneously. In Step 1420, the impact of the change on noise is assessed and in Step 1430 a decision is made regarding which direction to move. The process is then continuously repeated. Accordingly, the interference compensation parameters are adapted to address changes in operating environment, to thereby maintain an adequate level of interference compensation.

Figure 15:
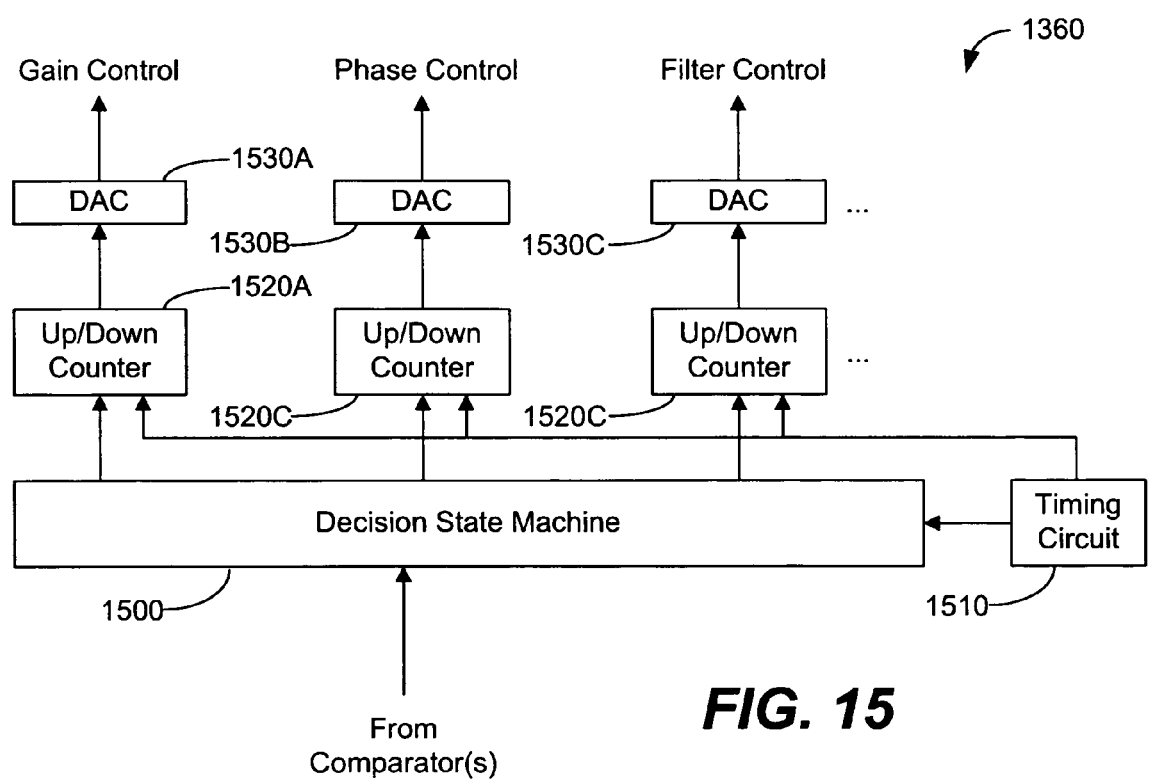
FIG. 15 illustrates a functional block diagram of a control and timing circuit according to one exemplary embodiment of the present invention.

Referring now to FIG. 15, this figure illustrates a control and timing circuit 1360 according to one exemplary embodiment of the present invention. The results of the comparator(s) feed the decision state machine 1500. The decision state machine then controls up/down counters 1520, which control DACs 1530. The DACs 1530 then control the gain, phase, and possibly other parameters of the emulation filter. A timing circuit 1510 coordinates the timing of the decision state machine with the other control loop circuits.

The system 1360 of FIG. 15 is generally scalable to control a varying number of emulation channel parameters. The gain and phase of the emulation channel are exemplary parameters that can be controlled. Other parameters that might be controlled are delay and emulation filter parameters such as center frequency or pole-zero locations.

Figure 16:
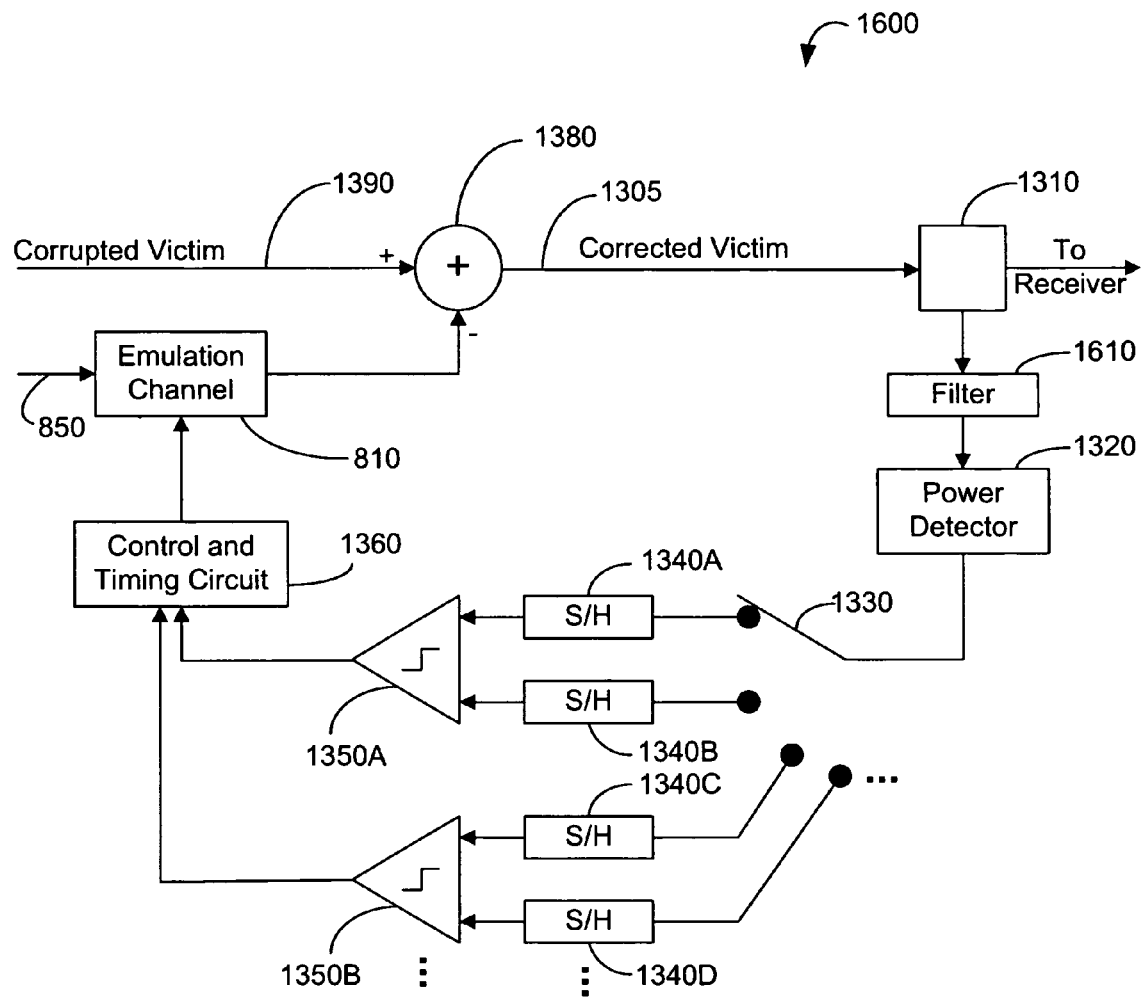
FIG. 16 illustrates an interference compensation circuit comprising a power detector having a filtered input according to one exemplary embodiment of the present invention.

Referring now to FIG. 16, this figure illustrates an interference compensation circuit 1600 comprising a filter 1610 prior to the power detector 1320. The filter 1610 before the power detector 1320 can be used to reject, or partially reject, the receive signal while substantially passing the aggressor signal such that the control loop is more sensitive to canceling the aggressor signal and can provide greater reduction of the aggressor signal below the receive signal. FIG. 16 also shows an exemplary embodiment that provides respective connections between multiple comparators 1350 and multiple sample-and-hold circuits 1340.

Figure 17:
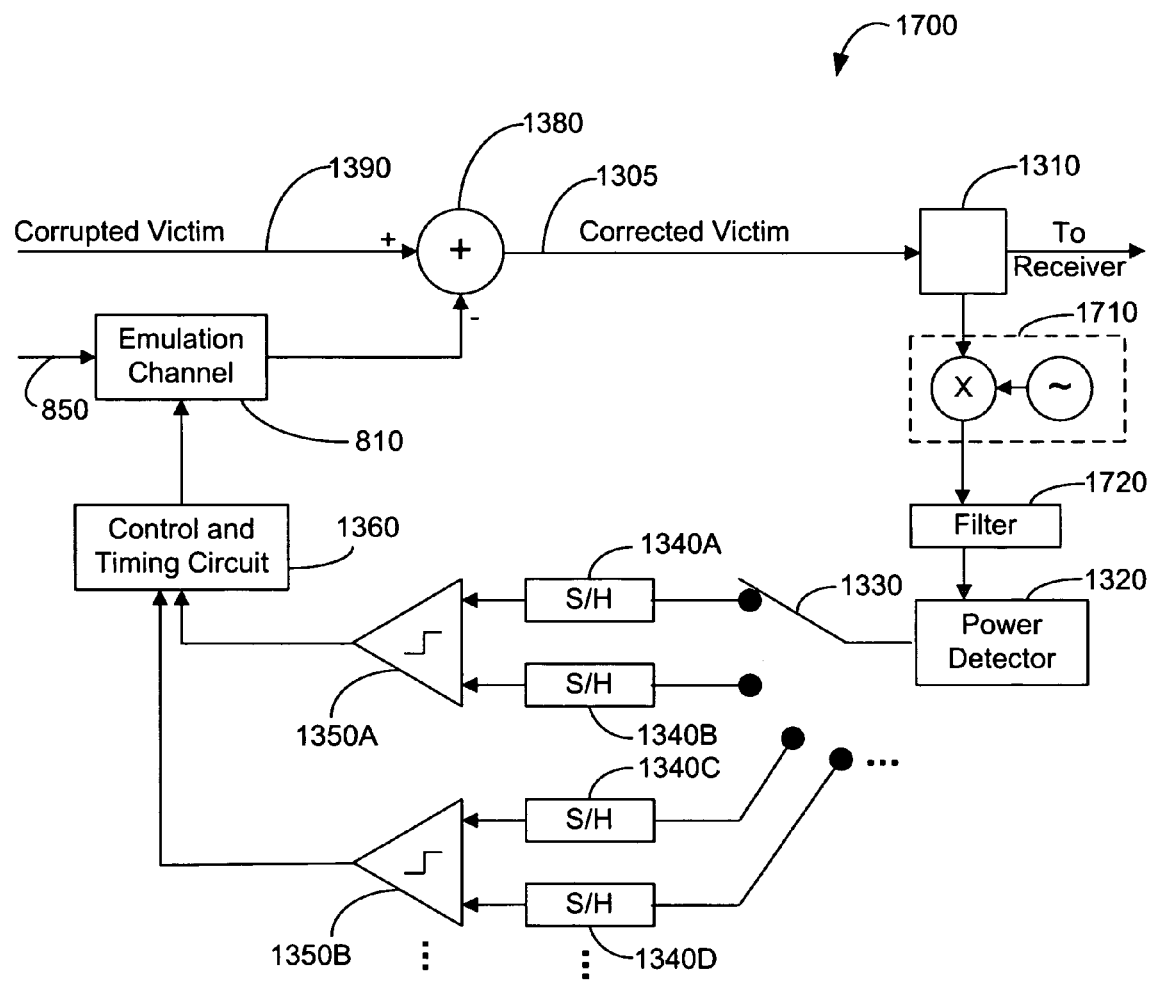
FIG. 17 illustrates an interference compensation circuit comprising a down converter and an intermediate frequency (IF) filter feeding a power detector according to one exemplary embodiment of the present invention.
Figure 18:
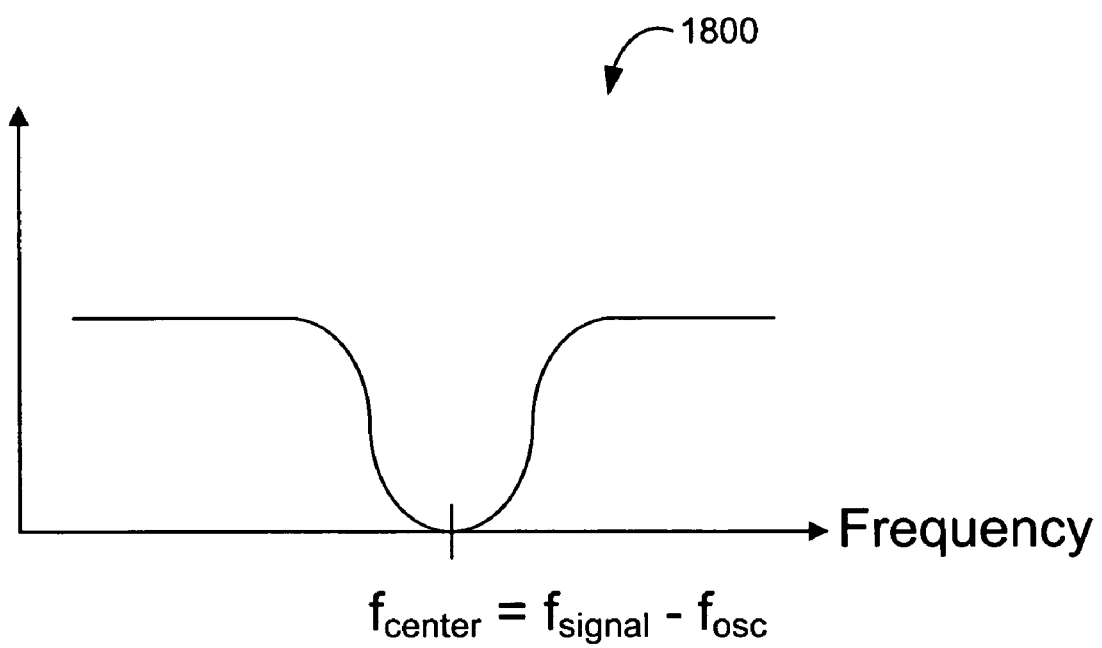
FIG. 18 illustrates a frequency response plot of an exemplary IF filter according to one exemplary embodiment of the present invention.

Referring now to FIG. 17, this figure illustrates an interference compensation circuit 1700 comprising a down converter 1710 and IF filter 1720 prior to the power detector 1320. The IF filter 1720 may have a response as shown in FIG. 18 where the down converted victim signal is rejected, but the residual aggressor noise is passed. A benefit of this illustrated embodiment of detecting the residual aggressor is that the fractional bandwidth of the rejected victim signal may be higher than the embodiment shown in FIG. 16, thereby providing a simpler filter implementation. In many circumstances, the overall result can provide a higher sensitivity to the aggressor residual over the victim signal in the control loop optimization. When the victim signal detected by the power detector is higher than the residual aggressor, the control loop is usually not as sensitive to the residual aggressor. Higher reduction of the aggressor signal can be achieved when the victim signal response can be removed prior to the power detector in the control loop.

Referring now to FIG. 18, this figure illustrates frequency response 1800 of the IF filter 1720, shown in FIG. 17, according to one exemplary embodiment of the present invention.

Figure 19:
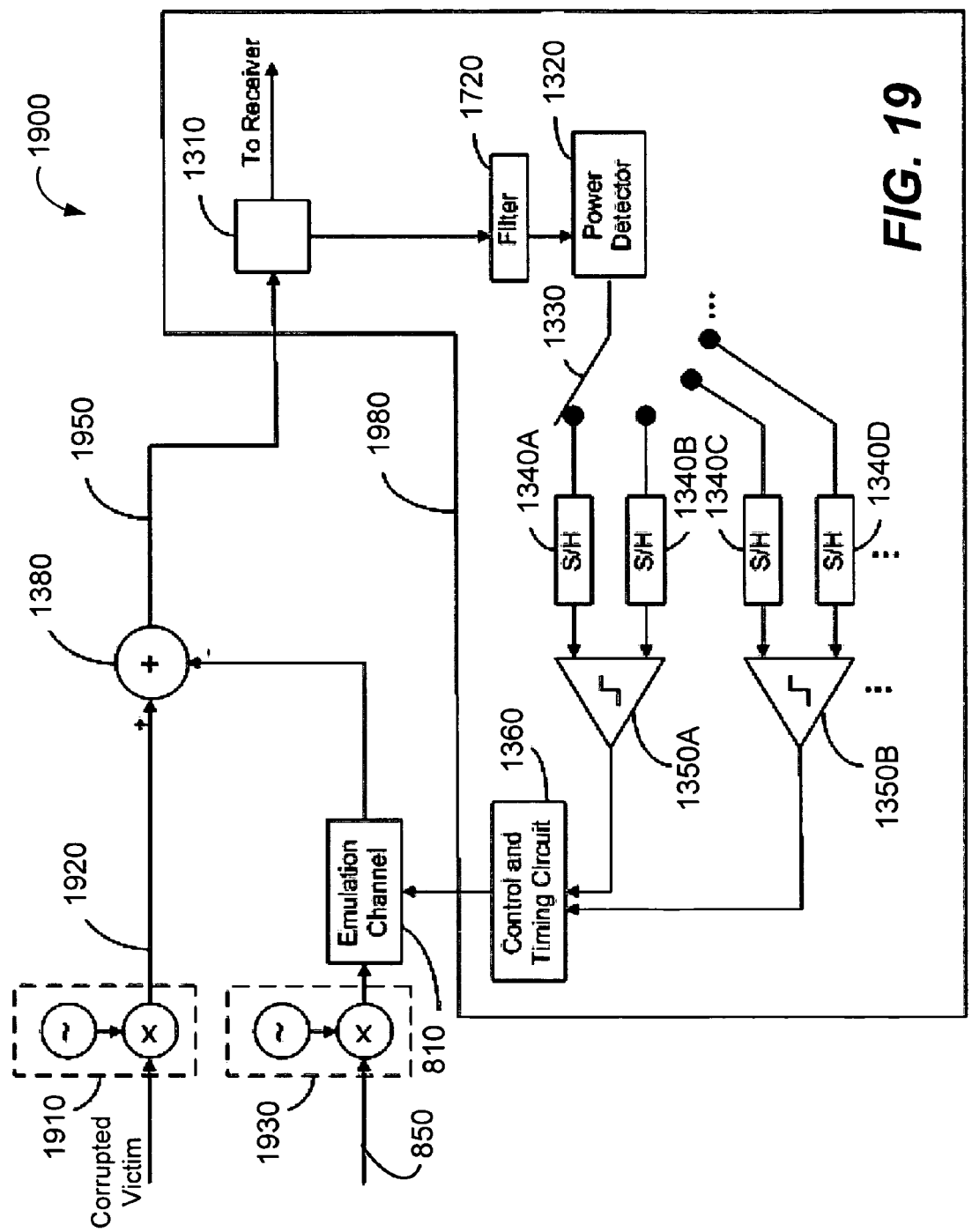
FIG. 19 illustrates an interference compensation circuit where the corrupted victim signal and the tapped aggressor signal are both down converted to an IF band prior to cancellation according to one exemplary embodiment of the present invention.

Referring now to FIG. 19, this figure illustrates an interference compensation circuit 1900 where the corrupted victim signal and the tapped aggressor signal 850 are both down converted by down converter 1910 and down converter 1930, respectively, to an IF band prior to the cancellation summer 1380. An advantage of this embodiment is that the emulation channel 810 and the control loop 1980 operate at the IF frequency instead of the RF frequency. In addition, the victim signal 1950 may not need further down conversion in the receiver. Finally, the filter 1720 before the control loop power detector 1320 has a higher fractional bandwidth for the victim signal, which makes rejection of the victim signal over the residual aggressor signal easier to implement with a realistic filter.

Figure 20:
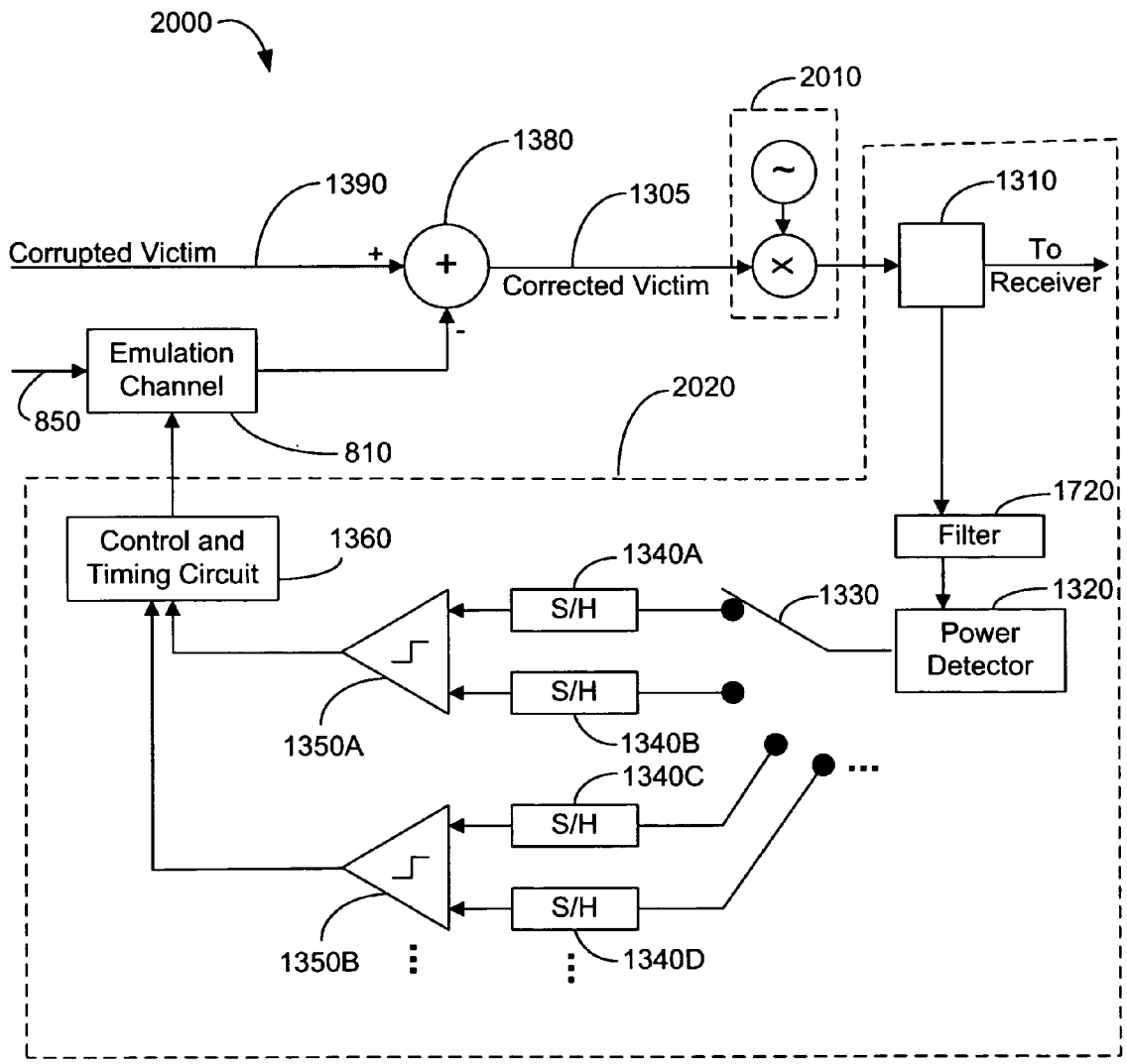
FIG. 20 illustrates an interference compensation circuit that uses a down converter prior to a receiver according to one exemplary embodiment of the present invention.

Referring now to FIG. 20, the Figure illustrates an interference compensation circuit 2000 comprising a down converter 2010 already present in the radio. Here, the tap-off 1310 is placed after down conversion to baseband frequencies and the addition of any extra mixing circuits (and associated power consumption) is avoided.

In summary, a system in accordance with an exemplary embodiment of the present invention can comprise: a sensor that obtains a representative interference sample or a sample of an interfering signal; an emulation channel that processes the sampled interfering signal to generate an interference compensation signal; and a control loop for controlling the emulation channel. A system in accordance with an exemplary embodiment of the present invention can alternatively, or also, comprise a circuit that operates in two or more modes to cancel, correct, or compensate for interference imposed on one communication signal by another signal. The system can be applied to wireless communication devices, such as mobile phones, wireless base-stations, personal data assistants (PDAs), satellite or cable television components, computers, radar systems, wireless network elements, etc.

One skilled in the art will appreciate that the present invention is not limited to the described applications and that the embodiments discussed herein are illustrative and not restrictive. Furthermore, it should be understood that various other alternatives to the embodiments of the invention described here may be recognized by one skilled in the art upon review of this text and the appended figures. Such embodiments may be employed in practicing the invention. Thus, the scope of the present invention is intended to be limited only by the claims below.

What is claimed is:

1. A method for reducing interference that a first communication signal induces on a second communication signal via an effect, comprising the steps of:
   obtaining a sample of the first communication signal;
   producing an interference compensation signal in response to processing the obtained sample with a model of the effect, the model comprising a signal processing parameter;
   reducing the interference to a level in response to applying the interference compensation signal to the second communication signal;
   changing the reduced level of the interference in response to perturbing the signal processing parameter;
   performing an assessment of the change; and
   refining the signal processing parameter according to the assessment;
   wherein the step of refining the signal processing parameter further comprises processing a second sample of the second communication signal with a circuit that comprises a first electrical component and a second electrical component, and
   wherein the method further comprises the steps of:
   removing power from the first electrical component in response to an occurrence of an event; and
   operating the circuit with power removed from the first electrical component while power feeds the second electrical component.

2. The method of claim 1, wherein performing the assessment of the change comprises determining whether to increase or to decrease the signal processing parameter.

3. The method of claim 2, wherein refining the signal processing parameter comprises increasing or decreasing the signal processing parameter according to the determination.

4. The method of claim 1, wherein refining the signal processing parameter comprises performing a gradient optimization of the signal processing parameter.

5. The method of claim 1, wherein performing the assessment of the change comprises monitoring for noise on a channel that carries the second communication signal, and wherein the effect comprises an interference effect.

6. The method of claim 1, wherein the signal processing parameter comprises a gain, and wherein refining the signal processing parameter comprises adjusting the gain.

7. The method of claim 1, wherein the signal processing parameter comprises a phase, and wherein refining the signal processing parameter comprises adjusting the phase.

8. The method of claim 1, wherein refining the signal processing parameter comprises refining the model to track a change in the effect.

9. The method of claim 1, wherein the effect comprises an interference effect, and wherein refining the signal processing parameter comprises compensating for a change in the interference effect associated with an operating environmental fluctuation.

10. The method of claim 1, wherein the first electrical component comprises a comparator and wherein the second electrical component comprises a memory register that stores a representation of the signal processing parameter.

11. The method of claim 1, wherein the first electrical component comprises a power detector and wherein the second electrical component comprises a memory element containing a number corresponding to the signal processing parameter.

* * * * *